(12) United States Patent
Tamura

(10) Patent No.: US 9,781,116 B2
(45) Date of Patent: Oct. 3, 2017

(54) AUTHORITY TRANSFER SYSTEM, METHOD THAT IS EXECUTED BY AUTHORITY TRANSFER SYSTEM, AND STORAGE MEDIUM

(71) Applicant: CANON KABUSHIKI KAISHA, Tokyo (JP)

(72) Inventor: Yu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 14/921,932

(22) Filed: Oct. 23, 2015

(65) Prior Publication Data

US 2016/0119351 A1    Apr. 28, 2016

(30) Foreign Application Priority Data

Oct. 27, 2014 (JP) ................. 2014-218724

(51) Int. Cl.
H04L 29/06 (2006.01)
(52) U.S. Cl.
CPC .................. H04L 63/10 (2013.01)
(58) Field of Classification Search
CPC ..................................................... H04L 63/10
See application file for complete search history.

(56) References Cited

U.S. PATENT DOCUMENTS

| | | | | |
|---|---|---|---|---|
| 6,742,116 B1 * | 5/2004 | Matsui | ................. | H04L 9/0894 709/204 |
| 7,454,497 B1 * | 11/2008 | Estabrooks | ........... | H04L 41/048 709/203 |
| 7,788,711 B1 * | 8/2010 | Sun | ..................... | H04L 63/0815 709/223 |
| 7,796,013 B2 * | 9/2010 | Murakami | ........... | A61B 5/1171 340/5.52 |
| 8,296,380 B1 * | 10/2012 | Kelly | ................ | G06F 17/30528 703/23 |
| 8,473,749 B1 * | 6/2013 | Madsen | .................. | H04L 67/34 713/187 |
| 8,544,069 B1 * | 9/2013 | Subbiah | ................. | G06F 21/41 340/5.8 |
| 8,590,014 B1 * | 11/2013 | Haugsnes | .............. | G06F 21/31 726/3 |
| 8,671,444 B2 * | 3/2014 | Kulkarni | ............. | H04L 63/0876 726/20 |
| 9,071,601 B2 * | 6/2015 | Tamura | ............... | H04L 63/0815 |
| 9,191,382 B1 * | 11/2015 | Hornung | ................. | G06F 21/31 |
| 9,225,707 B1 * | 12/2015 | de Sousa | ............. | G06F 21/629 |
| 9,276,928 B2 * | 3/2016 | Mani | ................... | H04L 63/0807 |
| 9,401,918 B2 * | 7/2016 | Lu | ........................ | G06F 21/6218 |
| 9,407,622 B2 * | 8/2016 | Field-Eliot | .......... | H04L 63/0807 |
| 9,450,940 B2 * | 9/2016 | Belov | ..................... | H04L 63/10 |
| 2001/0053691 A1 * | 12/2001 | Harma | .................... | A63F 13/12 455/419 |
| 2003/0005300 A1 * | 1/2003 | Noble | ..................... | G06F 21/35 713/172 |

(Continued)

FOREIGN PATENT DOCUMENTS

JP    2013-145505 A    7/2013

*Primary Examiner* — David García Cervetti
(74) *Attorney, Agent, or Firm* — Canon USA Inc., IP Division

(57) ABSTRACT

An authority transfer system enables omitting authorization of a user belonging to a tenant based on an authorization operation being performed at least once on a terminal associated with the tenant.

14 Claims, 17 Drawing Sheets

(56) References Cited

U.S. PATENT DOCUMENTS

| | | | | |
|---|---|---|---|---|
| 2004/0002878 A1* | 1/2004 | Hinton | G06Q 20/3821 | 705/76 |
| 2004/0093502 A1* | 5/2004 | Shurygailo | H04L 63/104 | 713/183 |
| 2005/0021956 A1* | 1/2005 | Genty | G06F 21/41 | 713/170 |
| 2006/0021018 A1* | 1/2006 | Hinton | H04L 63/06 | 726/10 |
| 2006/0021019 A1* | 1/2006 | Hinton | G06F 21/41 | 726/10 |
| 2006/0117104 A1* | 6/2006 | Taniguchi | H04L 63/0272 | 709/225 |
| 2006/0143189 A1* | 6/2006 | Imaeda | G06F 21/335 | |
| 2007/0011262 A1* | 1/2007 | Kitani | H04L 63/02 | 709/213 |
| 2007/0186273 A1* | 8/2007 | Carpy | H04L 63/0281 | 726/2 |
| 2007/0240204 A1* | 10/2007 | Somekawa | H04L 63/08 | 726/5 |
| 2008/0046983 A1* | 2/2008 | Lester | G06F 21/31 | 726/5 |
| 2008/0056238 A1* | 3/2008 | Inujima | H04L 12/66 | 370/352 |
| 2009/0111428 A1* | 4/2009 | Blommaert | H04W 12/04 | 455/411 |
| 2009/0144815 A1* | 6/2009 | Vrielink | G06F 21/10 | 726/7 |
| 2009/0183250 A1* | 7/2009 | Harada | G06F 21/10 | 726/9 |
| 2010/0169977 A1* | 7/2010 | Dasher | G06Q 20/3674 | 726/26 |
| 2010/0281522 A1* | 11/2010 | Hatakeyama | G06F 21/33 | 726/4 |
| 2010/0325441 A1* | 12/2010 | Laurie | G06F 21/31 | 713/185 |
| 2011/0202988 A1* | 8/2011 | Otranen | H04L 9/3213 | 726/8 |
| 2011/0225324 A1* | 9/2011 | Cooper | G06F 1/1632 | 710/13 |
| 2011/0258706 A1* | 10/2011 | Rouse | H04N 21/4516 | 726/28 |
| 2011/0321176 A1* | 12/2011 | Matsugashita | G06F 21/606 | 726/28 |
| 2012/0005727 A1* | 1/2012 | Lee | H04L 9/321 | 726/3 |
| 2012/0030773 A1* | 2/2012 | Schwesig | H04N 21/00 | 726/28 |
| 2012/0117626 A1* | 5/2012 | Yates | H04L 63/101 | 726/4 |
| 2012/0144501 A1* | 6/2012 | Vangpat | H04L 63/108 | 726/28 |
| 2012/0167189 A1* | 6/2012 | Aichroth | H04L 9/006 | 726/7 |
| 2012/0204221 A1* | 8/2012 | Monjas Llorente | G06F 21/335 | 726/1 |
| 2012/0210414 A1* | 8/2012 | Tamura | H04L 63/168 | 726/8 |
| 2012/0227089 A1* | 9/2012 | Lee | H04L 9/3213 | 726/4 |
| 2012/0240214 A1* | 9/2012 | Ogura | G06F 21/31 | 726/12 |
| 2012/0254957 A1* | 10/2012 | Fork | G06F 21/33 | 726/6 |
| 2012/0275597 A1* | 11/2012 | Knox | H04L 9/0833 | 380/210 |
| 2012/0291109 A1* | 11/2012 | Minamizawa | G06Q 10/10 | 726/6 |
| 2013/0080911 A1* | 3/2013 | Klemm | G06F 17/3089 | 715/745 |
| 2013/0086645 A1* | 4/2013 | Srinivasan | H04L 63/10 | 726/4 |
| 2013/0167253 A1* | 6/2013 | Seleznev | G06F 21/10 | 726/29 |
| 2013/0185558 A1* | 7/2013 | Seibert | H04L 9/3263 | 713/168 |
| 2013/0185784 A1* | 7/2013 | Tamura | H04L 63/0815 | 726/9 |
| 2013/0198516 A1* | 8/2013 | Fenton | H04L 63/0869 | 713/168 |
| 2013/0212212 A1* | 8/2013 | Addepalli | G06F 9/461 | 709/217 |
| 2013/0222839 A1* | 8/2013 | Armstrong | G06F 3/1203 | 358/1.14 |
| 2013/0246528 A1* | 9/2013 | Ogura | H04L 67/2814 | 709/204 |
| 2013/0268680 A1* | 10/2013 | Marton | H04L 63/0815 | 709/226 |
| 2014/0013396 A1* | 1/2014 | Field-Eliot | H04L 63/0807 | 726/4 |
| 2014/0019752 A1* | 1/2014 | Yin | H04L 63/0435 | 713/155 |
| 2014/0075513 A1* | 3/2014 | Trammel | H04L 9/3213 | 726/4 |
| 2014/0090027 A1* | 3/2014 | Tamura | H04L 63/08 | 726/4 |
| 2014/0090028 A1* | 3/2014 | Matsugashita | H04L 63/08 | 726/4 |
| 2014/0123236 A1* | 5/2014 | Hirata | H04L 63/0807 | 726/4 |
| 2014/0123240 A1* | 5/2014 | Seo | H04L 63/104 | 726/4 |
| 2014/0137232 A1* | 5/2014 | Kobayashi | H04L 63/10 | 726/17 |
| 2014/0143137 A1* | 5/2014 | Carlson | G06Q 20/02 | 705/39 |
| 2014/0160512 A1* | 6/2014 | Mori | H04N 1/00838 | 358/1.14 |
| 2014/0173125 A1* | 6/2014 | Selvanandan | H04L 67/141 | 709/229 |
| 2014/0181992 A1* | 6/2014 | Janson | G06F 21/60 | 726/27 |
| 2014/0189797 A1* | 7/2014 | Nori | H04L 63/0807 | 726/4 |
| 2014/0230020 A1* | 8/2014 | Mogaki | H04L 63/10 | 726/4 |
| 2014/0245402 A1* | 8/2014 | Matsugashita | H04L 63/10 | 726/4 |
| 2014/0280905 A1* | 9/2014 | Bryan | G06Q 10/06 | 709/224 |
| 2014/0280939 A1* | 9/2014 | Banatwala | H04L 47/70 | 709/225 |
| 2014/0304837 A1* | 10/2014 | Mogaki | G06F 21/33 | 726/28 |
| 2014/0337955 A1* | 11/2014 | Mendelovich | H04L 63/0807 | 726/9 |
| 2014/0351370 A1* | 11/2014 | Ashley | H04L 67/148 | 709/217 |
| 2014/0365653 A1* | 12/2014 | Matoba | H04L 63/10 | 709/225 |
| 2014/0373103 A1* | 12/2014 | Hirata | G06F 21/608 | 726/4 |
| 2014/0380428 A1* | 12/2014 | Kobayashi | G06F 21/335 | 726/4 |
| 2014/0380429 A1* | 12/2014 | Matsugashita | H04L 63/0884 | 726/4 |
| 2015/0040188 A1* | 2/2015 | Takeuchi | H04L 63/08 | 726/3 |
| 2015/0040189 A1* | 2/2015 | Fujii | H04L 63/08 | 726/3 |
| 2015/0067099 A1* | 3/2015 | Martin | H04L 67/10 | 709/217 |
| 2015/0089569 A1* | 3/2015 | Sondhi | H04L 63/08 | 726/1 |
| 2015/0089613 A1* | 3/2015 | Tippett | H04L 63/0853 | 726/7 |
| 2015/0101025 A1* | 4/2015 | Murata | G06F 21/10 | 726/4 |

(56) References Cited

U.S. PATENT DOCUMENTS

| | | | |
|---|---|---|---|
| 2015/0113596 A1* | 4/2015 | Mogaki | H04L 63/0815 726/3 |
| 2015/0128242 A1* | 5/2015 | Hoy | H04L 63/0884 726/9 |
| 2015/0134954 A1* | 5/2015 | Walley | H04L 63/08 713/168 |
| 2015/0135275 A1* | 5/2015 | Matsugashita | H04L 63/104 726/4 |
| 2015/0143484 A1* | 5/2015 | Violleau | H04L 63/0853 726/6 |
| 2015/0180863 A1* | 6/2015 | Kobayashi | H04L 47/70 726/9 |
| 2015/0188779 A1* | 7/2015 | McCanne | H04L 63/10 709/203 |
| 2015/0193600 A1* | 7/2015 | Matsuda | H04L 63/0823 726/9 |
| 2015/0199528 A1* | 7/2015 | Bobinski | H04L 63/0815 713/191 |
| 2015/0200936 A1* | 7/2015 | Kim | H04W 12/06 713/171 |
| 2015/0200948 A1* | 7/2015 | Cairns | G06F 21/44 726/4 |
| 2015/0207758 A1* | 7/2015 | Mordani | H04L 47/78 709/226 |
| 2015/0222643 A1* | 8/2015 | Sharif | H04L 63/0823 713/155 |
| 2015/0242597 A1* | 8/2015 | Danciu | G06F 21/10 726/30 |
| 2015/0264039 A1* | 9/2015 | Fukuda | G06F 21/41 726/8 |
| 2015/0295901 A1* | 10/2015 | Woodward | H04W 12/06 713/168 |
| 2015/0319185 A1* | 11/2015 | Kirti | H04L 63/1416 726/23 |
| 2015/0350179 A1* | 12/2015 | Kobayashi | H04L 63/08 726/4 |
| 2015/0350209 A1* | 12/2015 | Tamura | H04L 63/0884 713/155 |
| 2015/0373004 A1* | 12/2015 | Hopkins | H04L 63/08 726/6 |
| 2015/0373097 A1* | 12/2015 | Konkus | H04L 67/1025 709/203 |
| 2015/0373098 A1* | 12/2015 | Mordani | H04L 67/1025 709/203 |
| 2015/0381590 A1* | 12/2015 | Bosko | H04L 63/0428 713/171 |
| 2016/0014107 A1* | 1/2016 | Hamauzu | H04L 63/08 726/5 |
| 2016/0014212 A1* | 1/2016 | Zhang | H04L 67/141 709/226 |
| 2016/0044035 A1* | 2/2016 | Huang | H04L 63/0272 726/4 |
| 2016/0050203 A1* | 2/2016 | Hefetz | H04L 63/18 726/7 |
| 2016/0063471 A1* | 3/2016 | Kobres | G06F 21/316 705/18 |
| 2016/0065563 A1* | 3/2016 | Broadbent | H04L 63/0281 726/9 |
| 2016/0072839 A1* | 3/2016 | Mortimore, Jr. | H04L 63/0876 726/1 |
| 2016/0080374 A1* | 3/2016 | Kondoh | H04L 63/102 726/4 |
| 2016/0088026 A1* | 3/2016 | Mohamad Abdul | G06F 8/60 726/1 |
| 2016/0212617 A1* | 7/2016 | Koshimizu | H04L 9/0844 |
| 2016/0234213 A1* | 8/2016 | Kim | H04L 63/0876 |

* cited by examiner

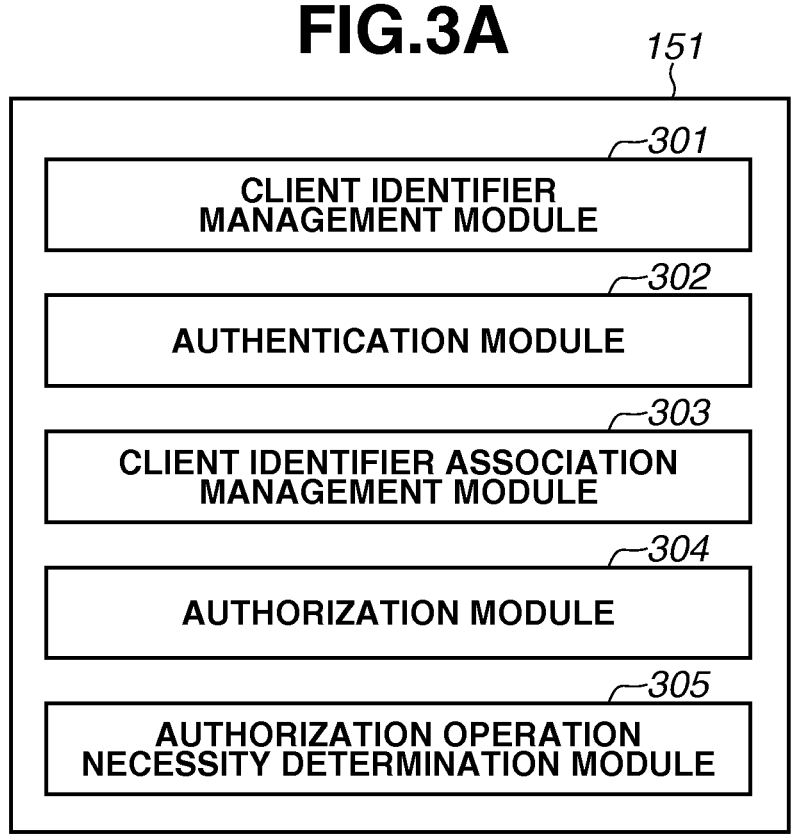
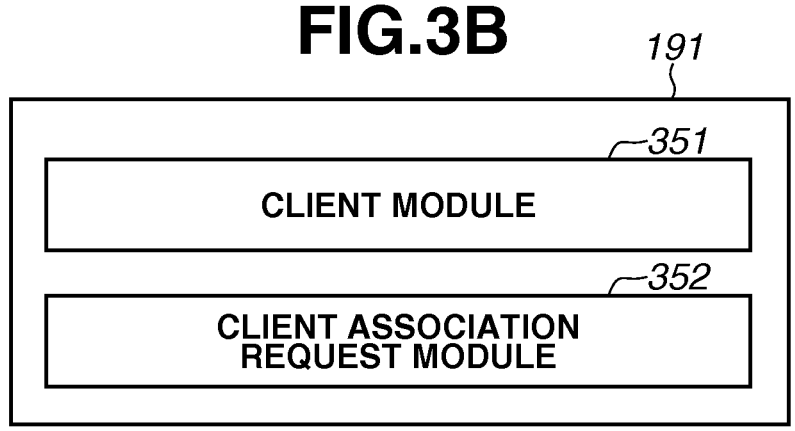

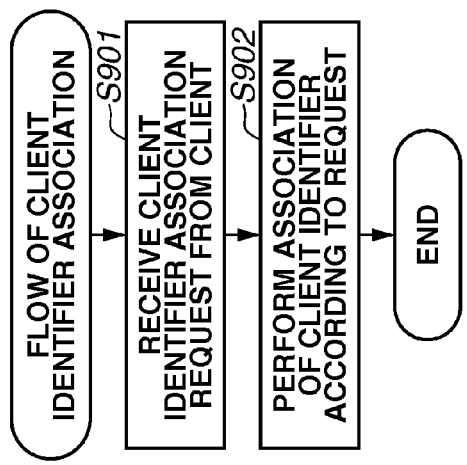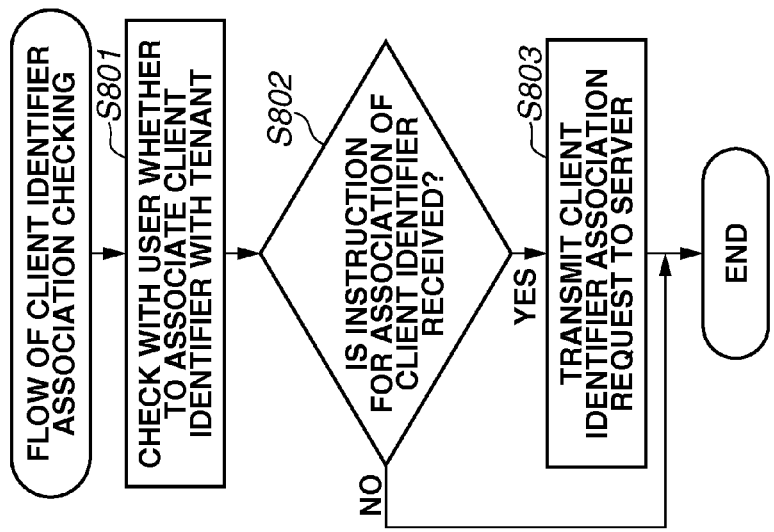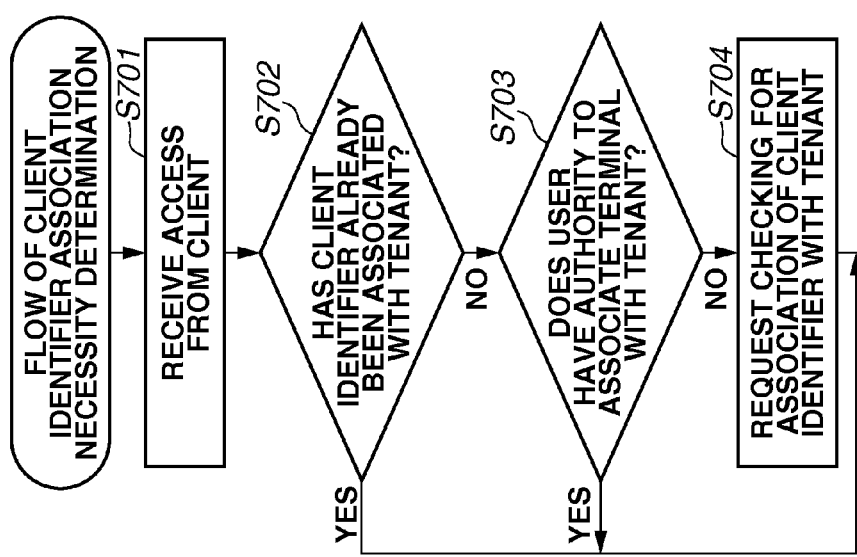

LOG INTO SERVER

USER ID  User X

PASSWORD  ********

LOGIN

ASSOCIATION OF CLIENT

DO YOU WANT TO ASSOCIATE THIS CLIENT WITH TENANT TO WHICH YOU BELONG?

IF YOU PERFORM AUTHORIZATION OPERATION USING ANY OF CLIENTS ASSOCIATED WITH TENANT, AUTHORIZATION OPERATION BECOMES ABLE TO BE OMITTED WITH RESPECT TO OTHER CLIENTS.

ASSOCIATE    DO NOT ASSOCIATE

CONFIRMATION OF AUTHORIZATION

AUTHORIZATION TO ACCESS YOUR DATA IS BEING REQUESTED.
PLEASE CONFIRM CONTENT AND PERMIT OR DENY ACCESS.

"DATA TO BE ACCESSED"
YOUR DATA IN REPOSITORY
"ACCESS SOURCE"
App-A-mobile CLIENT

PERMIT    DENY

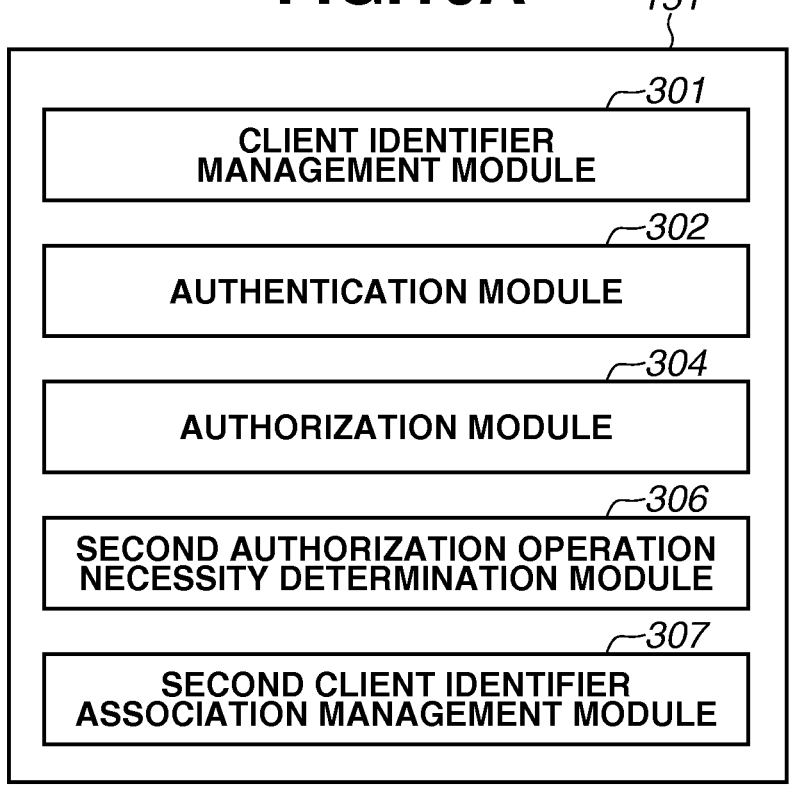
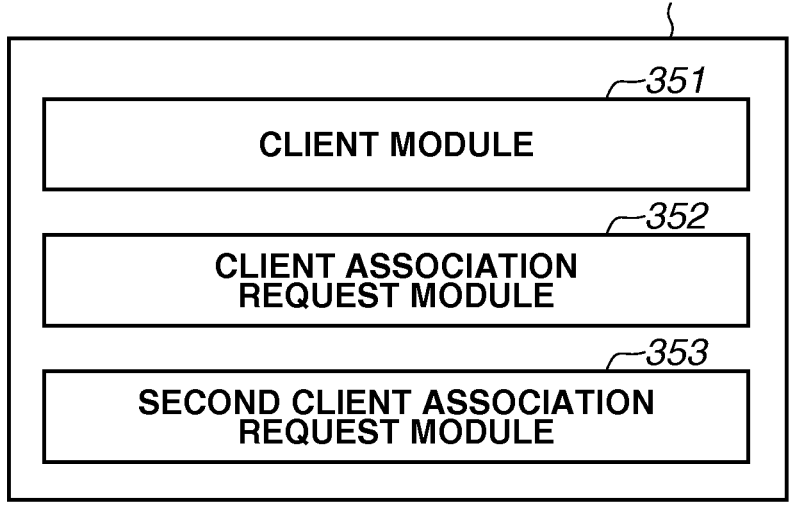

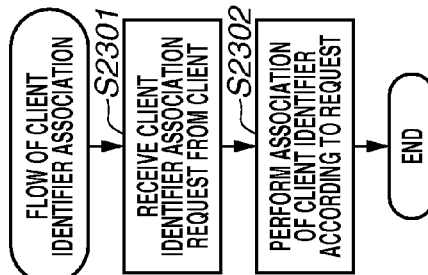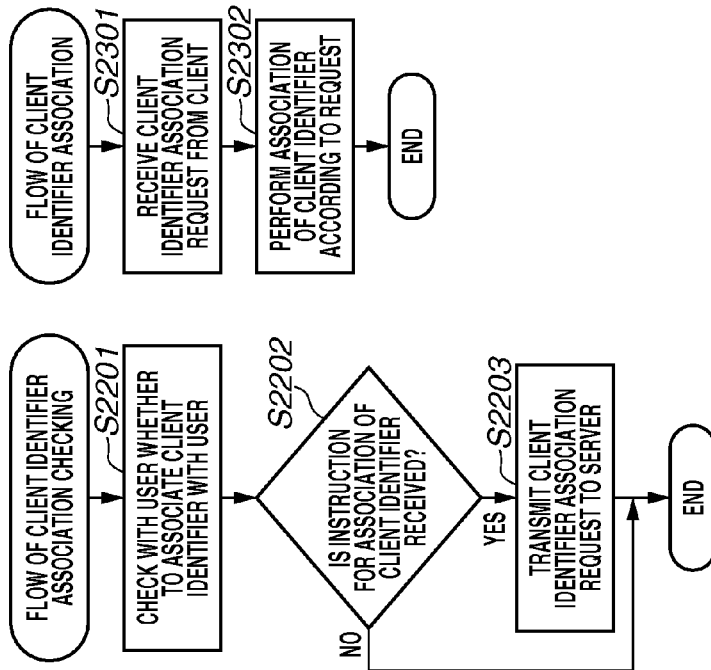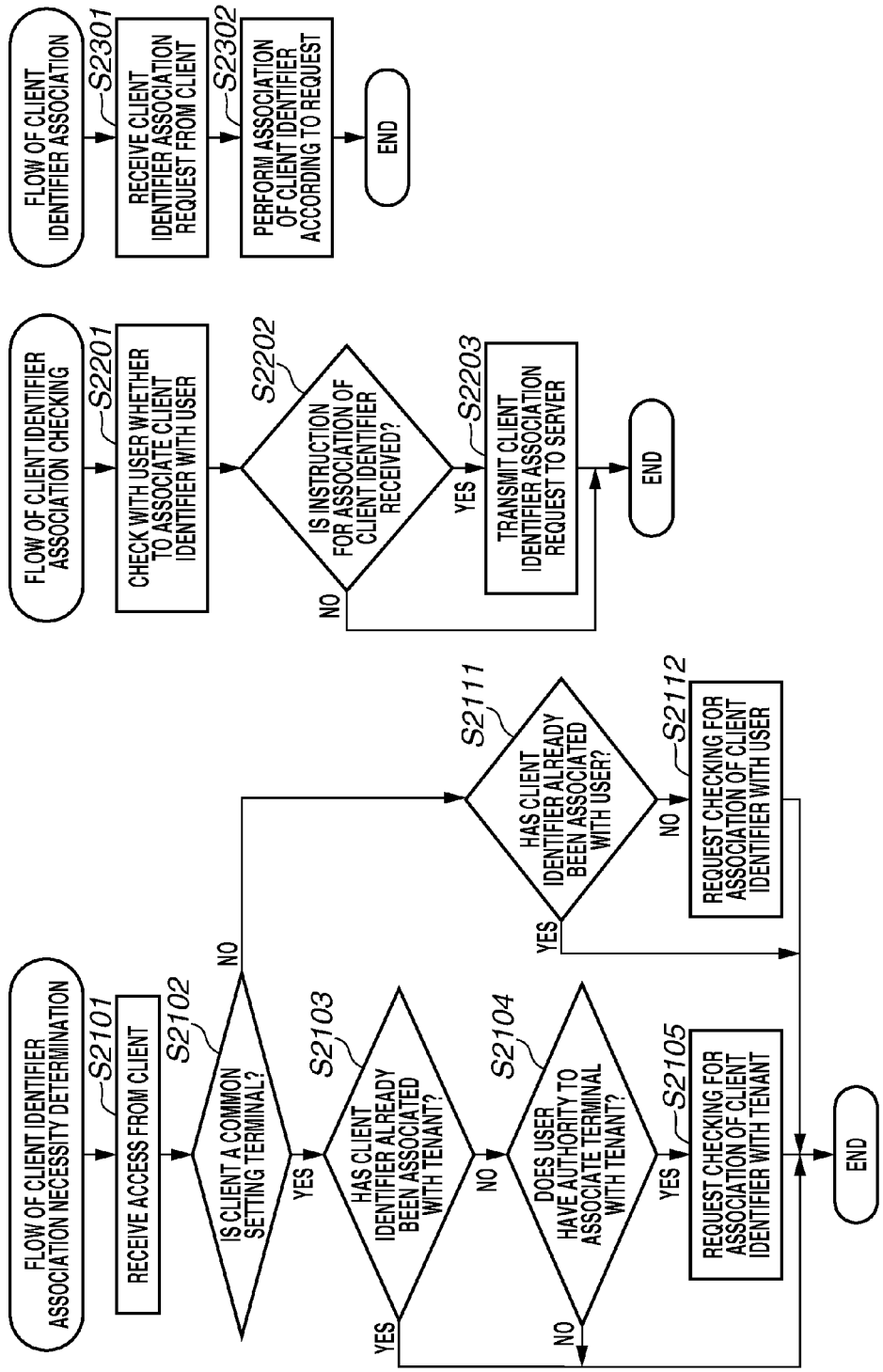

FIG.13

ASSOCIATION OF CLIENT

DO YOU WANT TO ASSOCIATE THIS CLIENT WITH YOUR USER ACCOUNT?

IF YOU PERFORM AUTHORIZATION OPERATION USING ANY OF CLIENTS ASSOCIATED WITH YOUR USER ACCOUNT, AUTHORIZATION OPERATION BECOMES ABLE TO BE OMITTED WITH RESPECT TO OTHER CLIENTS.

[ ASSOCIATE ]  [ DO NOT ASSOCIATE ]

2501

AUTHORITY TRANSFER SYSTEM, METHOD THAT IS EXECUTED BY AUTHORITY TRANSFER SYSTEM, AND STORAGE MEDIUM

BACKGROUND

Field

Aspects of the present invention generally relate to an authority transfer system that handles authorization processing for transferring the authority of a user in a service to a client, a method that is executed by the authority transfer system, and a storage medium.

Description of the Related Art

As cloud computing has become more popular, there are more and more opportunities for a plurality of services to cooperate with each other. The term "service" refers to a function, e.g., web application, that a server connected via a network, such as the Internet, provides. Services cooperating with each other enable providing users with new services obtained by adding value to an ordinarily provided service.

However, services cooperating with each other may cause the following issue. More information than a user desires may be transmitted and received between a plurality of services. This can result in exposure of confidential information about user data or personal information. While service cooperation may be realized between various services, services other than the service that the user has recognized should not be able to handle user data or personal information. However, from the point of view of the above-mentioned provision of added value, a scheme of service cooperation is necessary, and service providers desire that the scheme of service cooperation is able to be readily implemented.

Under such situations, a standard protocol called "OAuth" has been formulated for implementing cooperation regarding authorization. According to OAuth, for example, in a case where an application stored in a terminal is going accessing data managed by a cloud service, the application can receive an explicit authorization from the user, thus becoming able to access the data without performing authentication processing.

When the user has issued the authorization, the authority of the user is transferred to the application, so that the application is permitted to access the service. Since the application receives authorization information proving that the access has been permitted (hereinafter referred to as an "access token"), the subsequent accesses do not require the user's authentication operation, so that the access token is used to implement communications with the service. In the following description, an operation performed by the user to authorize the transfer of the authority of the user in a service to a third person so as to issue an access token is referred to as an "authorization operation". Japanese Patent Application Laid-Open No. 2013-145505 discusses technology concerned with the control of issuance of an access token in a case where OAuth has already been used.

In recent years, with the spread of smartphones, there are increased cases where one person possesses a plurality of terminals. Therefore, there is a possibility that the user may desire to seamlessly use terminals without being aware of which terminal the user is using among a plurality of terminals the user possesses.

For example, suppose that an application that accesses data managed by the cloud service is installed on each of the plurality of terminals. In order for the application to access data, an access token is necessary, and the user's authorization operation is necessary. According to a conventional method, the user is required to individually perform the authorization operation on each terminal the user possesses. This causes the user to be aware of on which terminal the authorization operation is completed and on which terminal the authorization operation is not yet completed, and thus does not result in a seamless usage of terminals.

SUMMARY

Aspects of the present invention are generally directed to solving the above-described issue by omitting, based on the fact that an authorization operation has been performed at least once on a terminal associated with a tenant, an authorization operation of a user belonging to the tenant.

According to an aspect of the present invention, an authority transfer system, which includes a terminal, a server that provides a service via a network, and a client that uses the service, includes an authentication unit configured to determine, based on authentication information input by a user via an authentication screen displayed on the terminal, whether the user is an authorized user, an issuance unit configured to, in a case where the user who has been determined by the authentication unit to be an authorized user has performed, via an authorization screen displayed on the terminal, an authorization operation to permit an authority of the user in the service to be transferred to the client provided in the terminal, issue authorization information indicating that the authority of the user has been transferred to the client, an authorization unit configured to authorize the client to use the service by the authority of the user based on the authorization information, which the terminal transmits to the client when the client makes a request to use the service, and a checking unit configured to check with the user whether to perform, on a tenant to which the user who has been determined by the authentication unit to be an authorized user belongs, a setting such that, when an additional user belonging to the tenant uses the service via the client provided in the terminal, the authorization information corresponding to the client is issued without the additional user performing the authorization operation, wherein, in response to the user performing the setting such that, when an additional user belonging to the tenant uses the service via the client provided in the terminal, the authorization information is issued without the additional user performing the authorization operation, the authorization unit authorizes the additional user to use the service without performing the authorization operation when the additional user uses the service via the client provided in the terminal.

Further features of the present disclosure will become apparent from the following description of exemplary embodiments with reference to the attached drawings.

BRIEF DESCRIPTION OF THE DRAWINGS

FIGS. 3A and 3B illustrate module configurations according to the first exemplary embodiment.

FIGS. 7A, 7B, and 7C are flowcharts illustrating the flow of client identifier association necessity determination, the flow of client identifier association checking, and the flow of client identifier association, respectively, according to the first exemplary embodiment.

FIGS. 8A, 8B, and 8C illustrate examples of display of screens according to the first exemplary embodiment.

FIGS. 10A and 10B illustrate module configurations according to a second exemplary embodiment.

FIGS. 12A, 12B, and 12C are flowcharts illustrating the flow of client identifier association necessity determination, the flow of client identifier association checking, and the flow of client identifier association, respectively, according to the second exemplary embodiment.

FIG. 13 illustrates an example of display of a screen according to the second exemplary embodiment.

DESCRIPTION OF THE EMBODIMENTS

Figure 1:
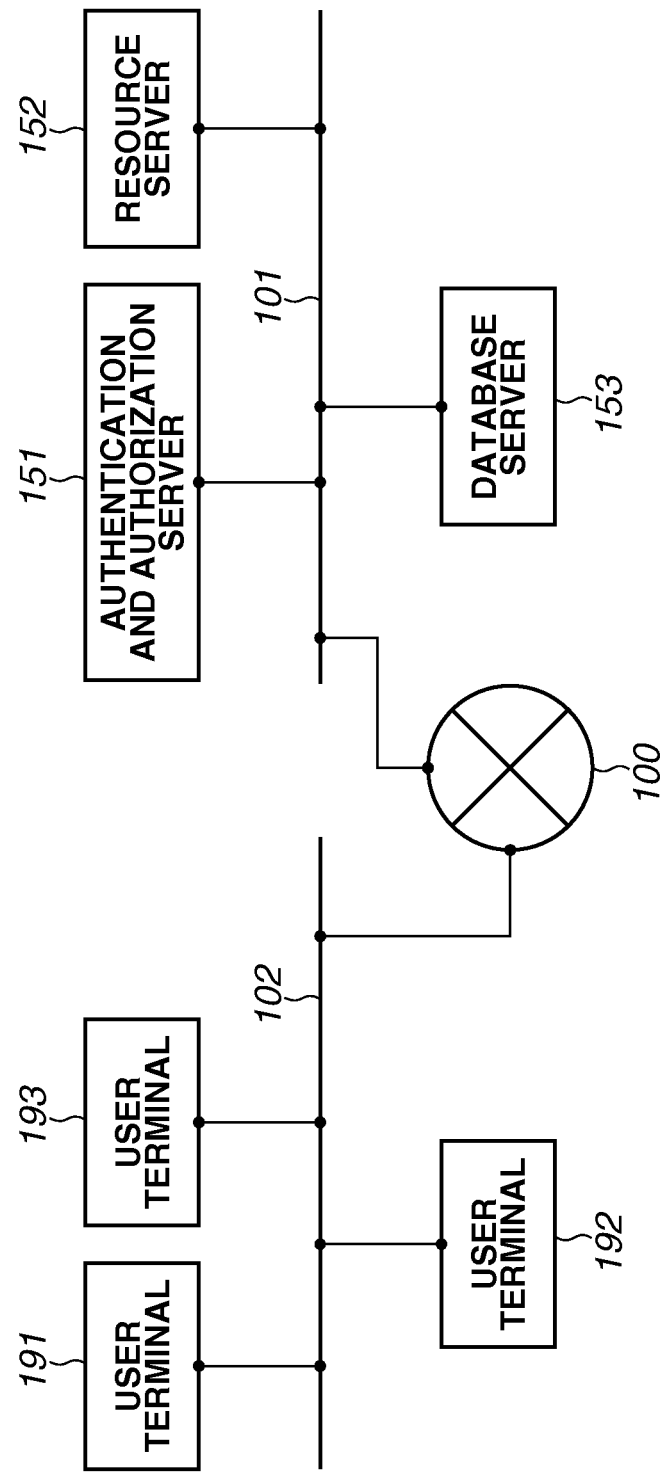
FIG. 1 illustrates a network configuration according to a first exemplary embodiment.

Various exemplary embodiments, features, and aspects of the present invention will be described in detail below with reference to the drawings. An authority transfer system according to a first exemplary embodiment is implemented on a network configured as illustrated in FIG. 1.

In the present exemplary embodiment, a World Wide Web (WWW) system is constructed via a wide area network (WAN) 100. To the WAN 100, there are connected a local area network (LAN) 101, which is used to interconnect constituent elements, and a network 102, to which user terminals 191, 192, and 193 are connected. The network 102 may be a LAN. Furthermore, if the user terminals 191, 192, and 193 are mobile terminals, the network 102 may be a wireless network.

The constituent elements connected to the LAN 101 include an authentication and authorization server 151, which performs the authentication of a user and the issuance of an access token, a resource server 152, which provides a service, and a database server 153. The user terminals 191, 192, and 193 are operable by the user. For example, an application stored in the user terminal using an access token for accessing data managed by the cloud service is capable of accessing data stored in the resource server 152 within the range of an authority granted to the user. The access token is a form of authorization information, which is expressed as an enumeration of alphanumeric characters.

The authentication and authorization server 151, the resource server 152, and the database server 153 are interconnected via the WAN 100 and the LAN 101. Furthermore, similarly, the user terminals 191, 192, and 193 are interconnected via the WAN 100 and the network 102. Furthermore, the authentication and authorization server 151, the resource server 152, and the database server 153 may be arranged on the respective individual LANs or may be arranged on one and the same LAN. Alternatively, the authentication and authorization server 151, the resource server 152, and the database server 153 may arranged on one and the same personal computer (PC) or server computer. Furthermore, the user terminals 191, 192, and 193 may be replaced with PCs (not illustrated) connected to the WAN 100 via the LAN 101, or may be replaced with a printing apparatus (not illustrated) or a mobile terminal.

Figure 2:
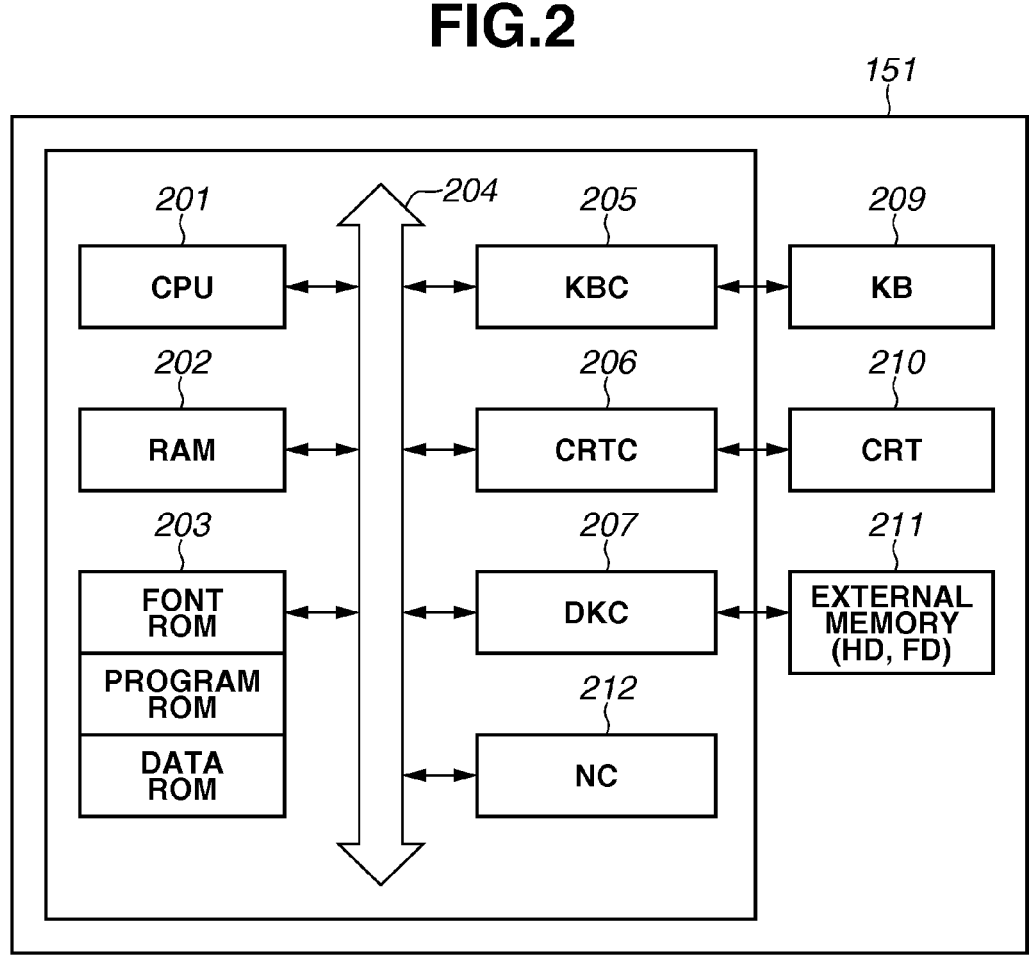
FIG. 2 illustrates a configuration of a server computer according to the first exemplary embodiment.

FIG. 2 illustrates the configuration of a server computer serving as the authentication and authorization server 151 according to the present exemplary embodiment. Furthermore, the configurations of server computers serving as the resource server 152 and the database server 153 and the configurations of the user terminals 191, 192, and 193 are similar to that illustrated in FIG. 2. Moreover, the hardware block diagram illustrated in FIG. 2 may correspond to the hardware block diagram of a general information processing apparatus, and the hardware configuration of a general information processing apparatus may be applied to the server computers and the user terminals in the present exemplary embodiment.

Referring to FIG. 2, a central processing unit (CPU) 201 executes programs, such as an OS and applications, stored in a program read-only memory (ROM) included in a ROM 203 or loaded onto a random access memory (RAM) 202 from a hard disk 211. The term "OS" as used herein is an abbreviation of "operating system", which runs on a computer, and hereinafter the operating system is referred to as an "OS". Processing in the flowcharts described below can be implemented by executing such programs. The RAM 202 functions as a main memory and a work area for the CPU 201. A keyboard controller (KBC) 205 controls key inputs from a keyboard (KB) 209 and a pointing device (not illustrated). A CRT controller (CRTC) 206 controls a display operation of a cathode-ray tube (CRT) display 210. A disk controller (DKC) 207 controls data access to an external memory 212, such as a hard disk (HD) or a flash disk (FD), which stores various pieces of data. A network controller (NC) 212, which is connected to a network, performs communication control processing with other devices connected to the network. The CPU 201, the RAM 202, the ROM 203, the KBC 205, the CRTC 206, the DKC 207, and the NC 212 are interconnected via an internal bus 204.

Furthermore, in the following entire description, unless otherwise stated, the subject of execution on hardware is the CPU 201, and the subject of execution on software is an application program installed on the hard disk (HD) 211.

FIGS. 3A and 3B illustrate module configurations of the authentication and authorization server 151 and the user terminal 191, respectively, according to the present exemplary embodiment. The authentication and authorization server 151 includes a client identifier management module 301, an authentication module 302, a client identifier association management module 303, and an authorization module 304. The authentication and authorization server 151 further includes an authorization operation necessity determination module 305. Furthermore, the user terminal 191 includes a client module 351 and a client association request module 352. The user terminals 192 and 193 each have a configuration illustrated in FIG. 3B, like the user terminal 191.

Figure 4A:
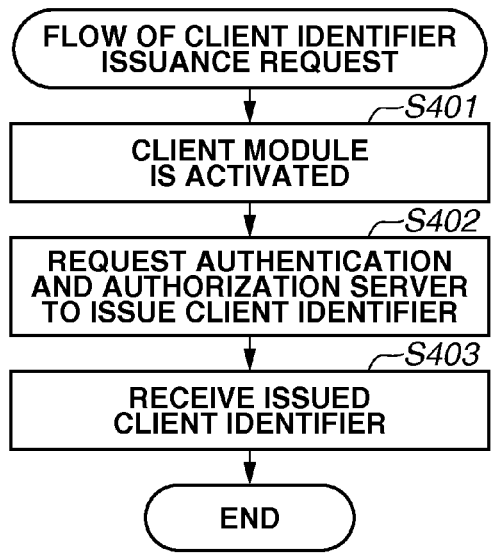
FIGS. 4A and 4B are flowcharts illustrating the flow of client identifier issuance request and the flow of client identifier issuance, respectively, according to the first exemplary embodiment.

FIG. 4A is a flowchart illustrating the flow of client identifier issuance request in the user terminal 191 according to the present exemplary embodiment. The flow illustrated in FIG. 4A is started by the user activating the client module 351.

In step S401, the client module 351 is activated in response to an activation instruction from the user. In step S402, the client module 351 requests the authentication and authorization server 151 to issue a client identifier. In order for the client module 351 to make a request for a client identifier, the client module 351 needs to have a client certificate previously allocated to the client module 351. In step S403, the client module 351 receives the client identifier issued by the authentication and authorization server 151. Then, the processing ends.

Figure 4B:
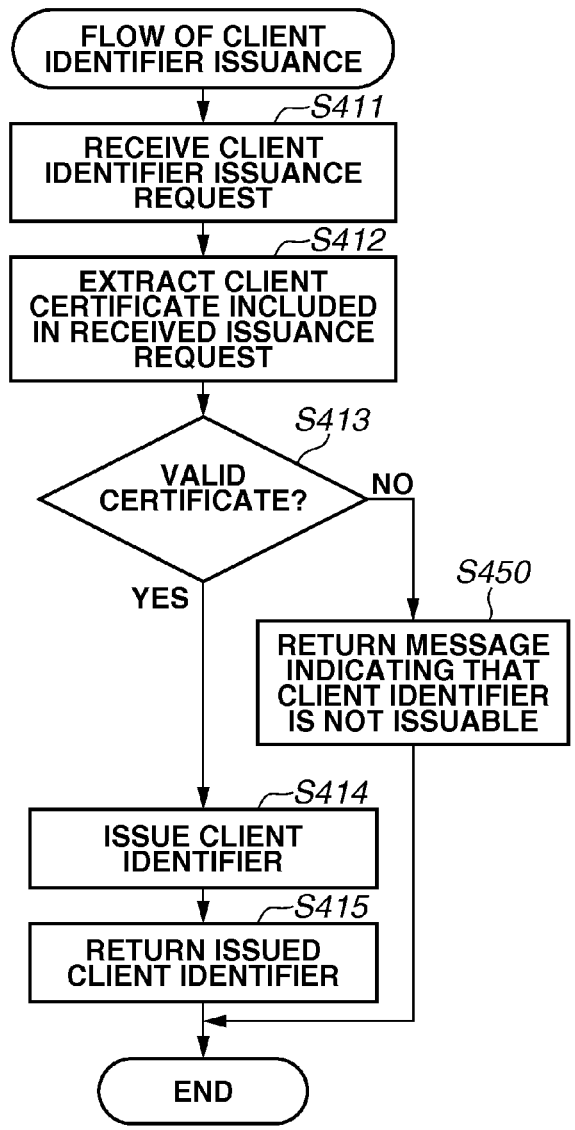

FIG. 4B is a flowchart illustrating the flow of client identifier issuance in the authentication and authorization server 151 according to the present exemplary embodiment. The flow illustrated in FIG. 4B is started in response to the reception of the client identifier issuance request from the client module 351. In step S411, the client identifier management module 301 receives the client identifier issuance request from the client module 351. In step S412, the client identifier management module 301 extracts a client certificate included in the received client identifier issuance request.

In step S413, the client identifier management module 301 determines whether the client certificate extracted in step S412 is a valid certificate. If the client identifier management module 301 determines that the extracted client certificate is a valid certificate (YES in step S413), the processing proceeds to step S414. If the client identifier management module 301 determines that the extracted client certificate is not a valid certificate (NO in step S413), the processing proceeds to step S450.

In step S414, the client identifier management module 301 issues a client identifier in response to the client identifier issuance request from the client module 351. The client identifier issued in this step is stored into the client identifier management module 301. Table 1 below is a client identifier table, which indicates the condition of issued client identifiers stored in the client identifier management module 301. Here, suppose that a client identifier AppAm001 is issued to the client module 351 of the user terminal 191, and a client identifier AppAm002 is issued to the client module 351 of the user terminal 192. Furthermore, suppose that a client identifier AppAm003 is issued to the client module 351 of the user terminal 193. Thus, different client identifiers are issued to the client modules 351 of the respective user terminals.

TABLE 1

| Client Identifier |
| --- |
| AppAm001 |
| AppAm002 |
| AppAm003 |
| . |
| . |
| . |

In step S415, the client identifier management module 301 returns the client identifier issued in step S414 to the client module 351. Then, the processing ends. In step S450, the client identifier management module 301 returns, to the client module 351, a message indicating that no client identifier is issuable. Then, the processing ends.

Figure 5A:
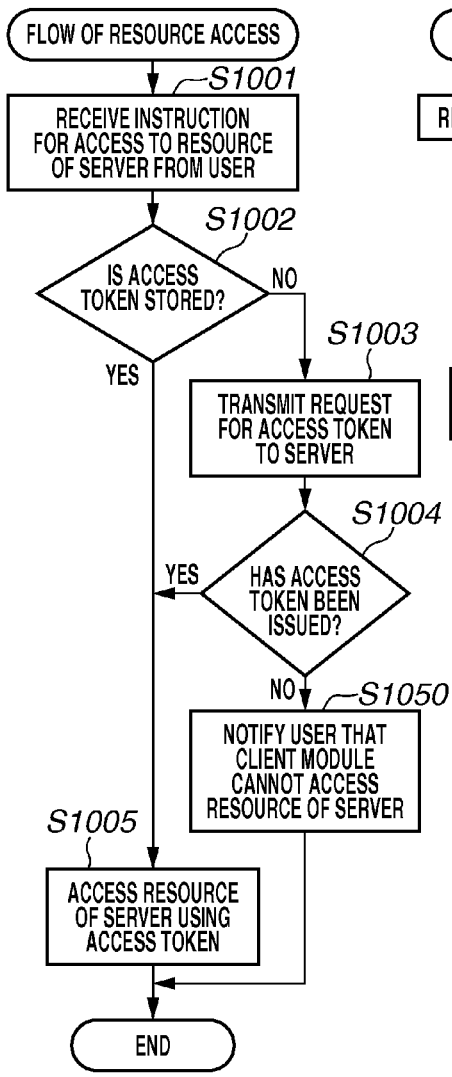
FIGS. 5A and 5B are flowcharts illustrating the flow of resource access and the flow of access token issuance, respectively, according to the first exemplary embodiment.

FIG. 5A is a flowchart illustrating the flow of access to a resource of the resource server 152, in the user terminal 191 according to the present exemplary embodiment. The flow illustrated in FIG. 5A is started in response to the client module 351 receiving an instruction for access to a resource of the resource server 152 from the user. In step S1001, the client module 351 receives an instruction for access to a resource of the resource server 152 from the user. In step S1002, the client module 351 determines whether an access token required for access to the resource server 152 is stored in the client module 351. If the client module 351 determines that the access token is stored (YES in step S1002), the processing proceeds to step S1005. If the client module 351 determines that no access token is stored (NO in step S1002), the processing proceeds to step S1003.

In step S1003, the client module 351 transmits a request for an access token to the authentication and authorization server 151. The request for an access token includes information about the user operating the user terminal 191 and the client identifier received in step S403. In step S1004, the client module 351 determines whether an access token has been issued as a response to the request transmitted in step S1003. If the client module 351 determines that the access token has been issued (YES in step S1004), the processing proceeds to step S1005. If the client module 351 determines that no access token has been issued (NO in step S1004), the processing proceeds to step S1050.

In step S1005, the client module 351 stores the access token acquired in response to the request transmitted in step S1003, and transmits the acquired access token to the resource server 152 to access a resource of the resource server 152. Then, the processing ends. In step S1050, the client module 351 notifies the user that the client module 351 cannot access the resource server 152 since the client module 351 was not able to acquire the access token. Then, the processing ends.

Figure 5B:
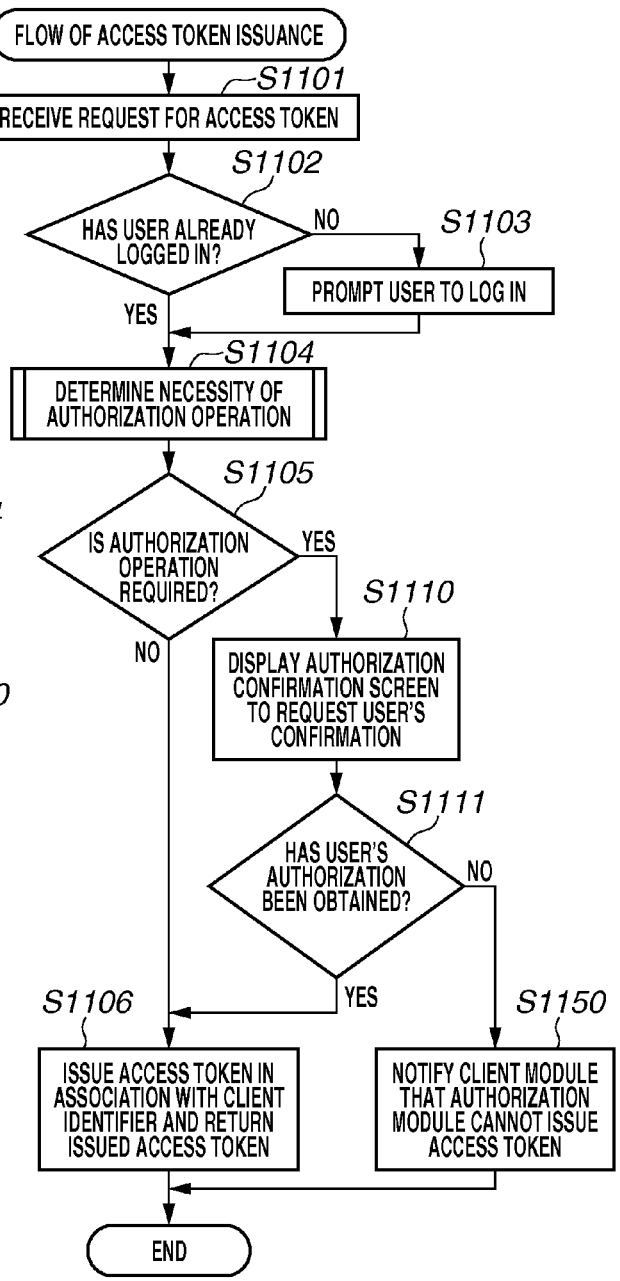

FIG. 5B is a flowchart illustrating the flow of access token issuance in the authentication and authorization server 151 according to the present exemplary embodiment. The flow illustrated in FIG. 5B is started in response to the authorization module 304 of the authentication and authorization server 151 receiving the request for an access token from the client module 351. In step S1101, the authorization module 304 receives the request for an access token from the client module 351. The request for an access token received in step S1101 includes information about the user and the client identifier.

In step S1102, the authorization module 304 determines whether the user operating the client module 351 has already logged in. If the authorization module 304 determines that the user has already logged in (YES in step S1102), the processing proceeds to step S1104. If the authorization module 304 determines that the user has not yet logged in (NO in step S1102), the processing proceeds to step S1103. In step S1103, the authentication module 302 instructs the client module 351 to display a login screen 1401 such as that illustrated in FIG. 8A, thus prompting the user to log in. The user enters authentication information via the login screen 1401, which is an authentication screen, and the authentication module 302 determines whether the user is an authorized user, based on the entered authentication information.

In step S1104, the authorization operation necessity determination module 305 determines whether an authorization operation is required to be performed by the user with respect to the request for an access token received in step S1101. In step S1105, the authorization operation necessity determination module 305 determines processing to be next performed based on a result of determination in step S1104. If, as a result of determination in step S1104, the authorization operation necessity determination module 305 determines that the authorization operation is required (YES in step S1105), the processing proceeds to step S1110. If, as a result of determination in step S1104, the authorization operation necessity determination module 305 determines that the authorization operation is not required (NO in step S1105), the processing proceeds to step S1106.

In step S1106, the authorization module 304 issues an access token and stores the access token in association with the client identifier and user information included in the request for an access token received in step S1101. Furthermore, in step S1106, the authorization module 304 returns the issued access token to the client module 351. Then, the processing ends. In step S1110, the authorization module 304 instructs the client module 351 to display an authorization confirmation screen 1403 such as that illustrated in FIG. 8C, thus requesting the user's confirmation.

In step S1111, the authorization module 304 determines whether the user's authorization has been obtained in response to the request in step S1110. If the authorization module 304 determines that the user's authorization has been obtained (YES in step S1111), the processing proceeds to step S1006. If the authorization module 304 determines that the user's authorization has not been obtained (NO in step S1111), the processing proceeds to step S1150. An operation performed by the user to select "PERMIT" in FIG. 8C so as to perform authorization is referred to as an "authorization operation". When the authorization operation is performed by the user, an access token is issued. Furthermore, the authority of the user in FIG. 8C is an access authority to data associated with the user. In actuality, the authority of the user includes other authorities, an example of which is an authority to use an application program interface (API). In step S1150, the authorization module 304 notifies the client module 351 that the authorization module 304 cannot issue an access token. Then, the processing ends.

Figure 6:
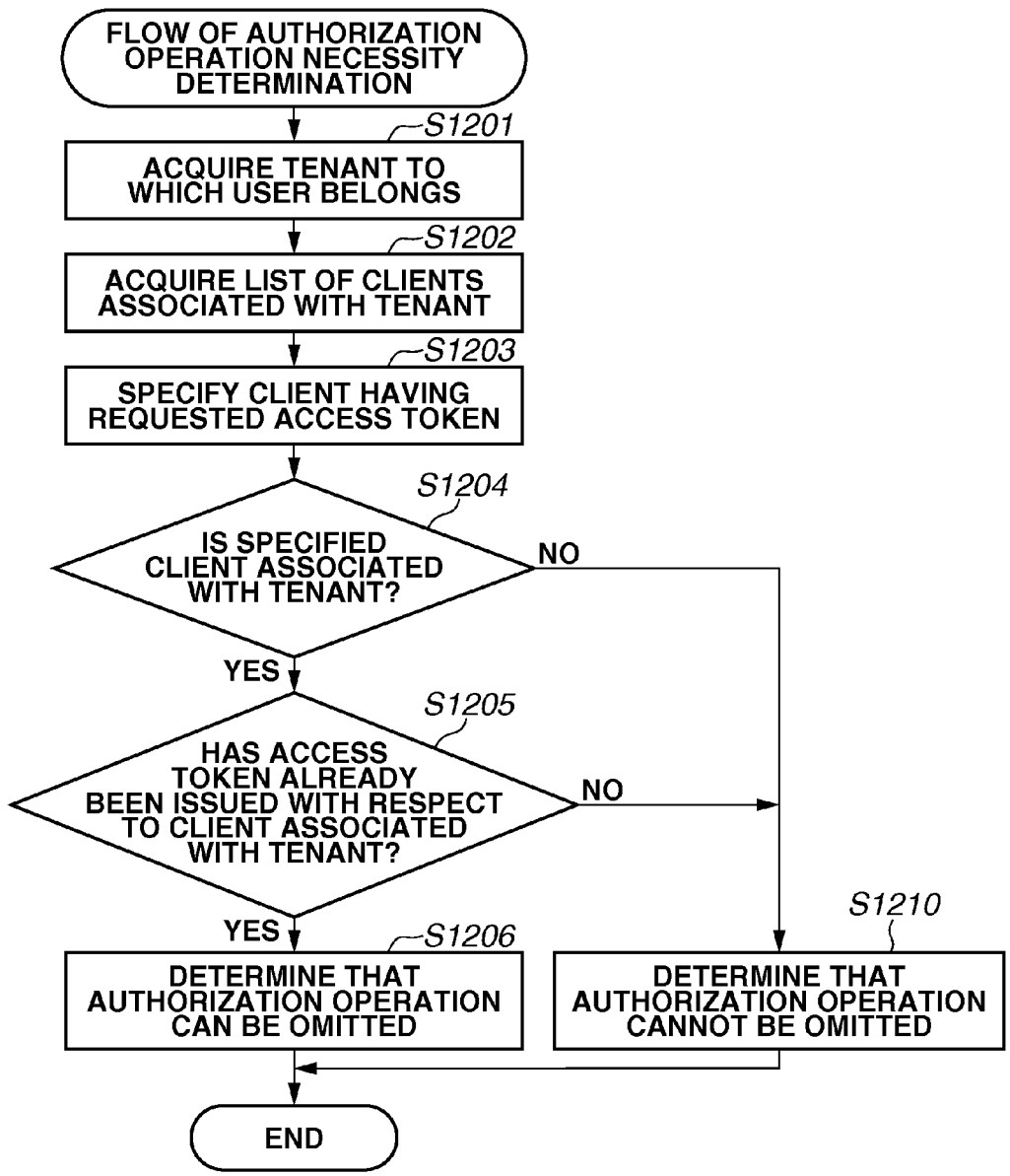
FIG. 6 is a flowchart illustrating the flow of authorization operation necessity determination according to the first exemplary embodiment.

FIG. 6 is a flowchart illustrating the flow of authorization operation necessity determination in the authentication and authorization server 151 according to the present exemplary embodiment. The flow illustrated in FIG. 6 indicates the details of the flow in step S1104 illustrated in FIG. 5B. In step S1201, the authorization operation necessity determination module 305 acquires a tenant to which the user belongs, based on the authentication information about the user included in the access token request received in step S1101. In order to acquire the tenant, it is necessary to refer to a user management table such as that set forth as Table 2 below. Furthermore, in the present exemplary embodiment, the authentication information and the user identifier for identifying the user are identical with each other, but may be different from each other. Here, for example, if the user is "User X", the user identifier is "User X", and, thus, the tenant identifier associated with the user identifier "User X" is determined as "Tenant T". As a result, the tenant to which the user belongs is specified as "Tenant T".

TABLE 2

| User | Tenant | Authority |
| --- | --- | --- |
| User X | Tenant T | User |
| Administrator Y | Tenant T | Administrator |
| . | . | . |
| . | . | . |
| . | . | . |

In step S1202, the authorization operation necessity determination module 305 acquires a list of client identifiers associated with the tenant acquired in step S1201. In order to acquire the client identifiers, the authorization operation necessity determination module 305 refers to a client identifier association table such as that set forth as Table 3 below. Here, for example, if the tenant is "Tenant T", the client identifiers associated with the tenant "Tenant T" are determined as "AppAm001" and "AppAm002".

TABLE 3

| Tenant | Client Identifier |
| --- | --- |
| Tenant T | AppAm001 |
| Tenant T | AppAm002 |
| . | . |
| . | . |
| . | . |

In step S1203, the authorization operation necessity determination module 305 acquires a client identifier included in the access token request received in step S1101. In step S1204, the authorization operation necessity determination module 305 determines whether the client identifier acquired in step S1203 is included in the list of client identifiers acquired in step S1202. If the authorization operation necessity determination module 305 determines that the acquired client identifier is included in the acquired list of client identifiers (YES in step S1204), since the client identifier is already associated with the tenant, the processing proceeds to step S1205. If the authorization operation necessity determination module 305 determines that the acquired client identifier is not included in the acquired list of client identifiers (NO in step S1204), since the client identifier is not associated with the tenant, the processing proceeds to step S1210.

In step S1205, the authorization operation necessity determination module 305 determines whether an access token for the user has already been issued with respect to any client identifier in the list of client identifiers acquired in step S1202. If the authorization operation necessity determination module 305 determines that the access token has already been issued (YES in step S1205), the processing proceeds to step S1206. If the authorization operation necessity determination module 305 determines that the access token has not yet been issued (NO in step S1205), the processing proceeds to step S1210. Here, the authorization operation necessity determination module 305 refers to an access token table such as that set forth as Table 4 below, and determines whether an access token for the user corresponding to a client identifier included in the list exists. For example, suppose that the user is "User X" and the list of client identifiers includes "AppAm001" and "AppAm002". In this instance, it is determined from Table 4 that an access token for the user "User X" exists with respect to the client identifier "AppAm001". Furthermore, the present exemplary embodiment may be modified to omit step S1205 such that the authorization operation can be omitted in response to the confirmation that a client provided in the terminal is associated with the tenant.

TABLE 4

| Client Identifier | User | Access Token |
|---|---|---|
| AppAm001 | User X | 11111111 |
| . | . | . |
| . | . | . |
| . | . | . |

In step S1206, the authorization operation necessity determination module 305 determines that the authorization operation can be omitted to issue an access token. Then, the processing ends. The result of determination in step S1206 is used in step S1105 illustrated in FIG. 5B. Furthermore, there are several types of methods for omitting the authorization operation. For example, a method of preventing the screen illustrated in FIG. 8C from being displayed can be conceived. In this case, the processing advances without the user consciously performing the authorization operation. In step S1210, the authorization operation necessity determination module 305 determines that the authorization operation cannot be omitted to issue an access token. Then, the processing ends. The result of determination in step S1210 is used in step S1105 illustrated in FIG. 5B.

FIG. 7A is a flowchart illustrating the flow of client identifier association necessity determination in the authentication and authorization server 151 according to the present exemplary embodiment. The flow illustrated in FIG. 7A is started in response to the authentication and authorization server 151 receiving, from the client module 351, an access including user information. For example, the flow may be executed after the user's login operation in step S1103 illustrated in FIG. 5B.

In step S701, the client identifier association management module 303 receives an access from the client module 351. The access received in step S701 includes user information and a client identifier. In step S702, the client identifier association management module 303 determines whether the client identifier has already been associated with the tenant to which the user belongs, based on the user information and the client identifier, which are included in the access received in step S701. If the client identifier association management module 303 determines that the client identifier has already been associated with the tenant (YES in step S702), the processing ends without the client identifier association management module 303 requesting the client to check for the association between the tenant and the client identifier. If the client identifier association management module 303 determines that the client identifier has not yet been associated with the tenant (NO in step S702), the processing proceeds to step S703. In the determination in step S702, the tenant to which the user belongs is determined based on the user management table set forth in Table 2, and the tenant with which the client is associated is determined based on the client identifier association table set forth in Table 3.

In step S703, the client identifier association management module 303 determines whether a user indicated by the user information included in the access received in step S701 has an authority to associate a client identifier with a tenant. In the determination performed in step S703, suppose that, when a user is the administrator of a tenant, the user has an authority to associate a client identifier with the tenant. Furthermore, in the determination performed in step S703, the authority of the user is determined based on the user management table set forth in Table 2. If the client identifier association management module 303 determines that the user has an authority to associate a client identifier with a tenant (YES in step S703), the processing proceeds to step S704. If the client identifier association management module 303 determines that the user has no authority to associate a client identifier with a tenant (NO in step S703), the processing ends without the client identifier association management module 303 requesting the client to check for the association between the tenant and the client identifier.

In step S704, the client identifier association management module 303 requests the client module 351 to check for the association between the tenant and the client identifier, and prompts the client to display a client association checking screen 1402 such as that illustrated in FIG. 8B. Upon completion of the request for checking of the association between the tenant and the client identifier, the processing ends.

FIG. 7B is a flowchart illustrating the flow of client identifier association checking in the user terminal 191 according to the present exemplary embodiment. The flow illustrated in FIG. 7B is started in response to the user terminal 191 receiving, from the authentication and authorization server 151, the request for checking of the association between the tenant and the client identifier, which is performed in step S704 illustrated in FIG. 7A. In step S801, the client association request module 352 displays a client association checking screen 1402 such as that illustrated in FIG. 8B according to the request from the authentication and authorization server 151. Displaying the client association checking screen 1402 is used to check with the user whether to associate the client identifier with the tenant to which the user belongs.

In step S802, the client association request module 352 determines whether an instruction from the user to associate the client identifier with the tenant has been received as a result of checking in step S801. If the client association request module 352 determines that the instruction has been received (YES in step S802), the processing proceeds to step S803. If the client association request module 352 determines that the instruction has not been received (NO in step S802), the processing ends without the client association request module 352 performing a client identifier association request. In step S803, the client association request module 352 transmits a client identifier association request to the authentication and authorization server 151. The client identifier association request to be transmitted to the authentication and authorization server 151 includes the tenant to which the user operating the user terminal 191 belongs and the client identifier received in step S403. Upon completion of the transmission of the client identifier association request, the processing ends.

FIG. 7C is a flowchart illustrating the flow of client identifier association in the authentication and authorization server 151 according to the present exemplary embodiment. The flow illustrated in FIG. 7C is started in response to the authentication and authorization server 151 receiving the client identifier association request from the user terminal 191. In step S901, the client identifier association management module 303 receives the client identifier association request from the client association request module 352. The client identifier association request received in step S901 includes the user information and the client identifier.

In step S902, the client identifier association management module 303 stores the client identifier included in the request received in step S901 into the client identifier association table according to the request from the client. For example, if a tenant to which the user belongs is specified by the client, the client identifier association management module 303 stores the client identifier in association with the specified tenant. Upon completion of the storage for association, the processing ends.

FIGS. 8A, 8B, and 8C illustrate examples of display of screens according to the present exemplary embodiment. FIG. 8A illustrates an example of the login screen 1401, which is operable for the user to log in. FIG. 8B illustrates an example of the client association checking screen 1402, which is used to check with the user whether to associate the client identifier with the tenant to which the user belongs. FIG. 8C illustrates an example of the authorization confirmation screen 1403, which is used for the user to authorize the client identifier and to permit an access token to be issued, and which is also referred to as an "authorization screen".

Figure 9A:
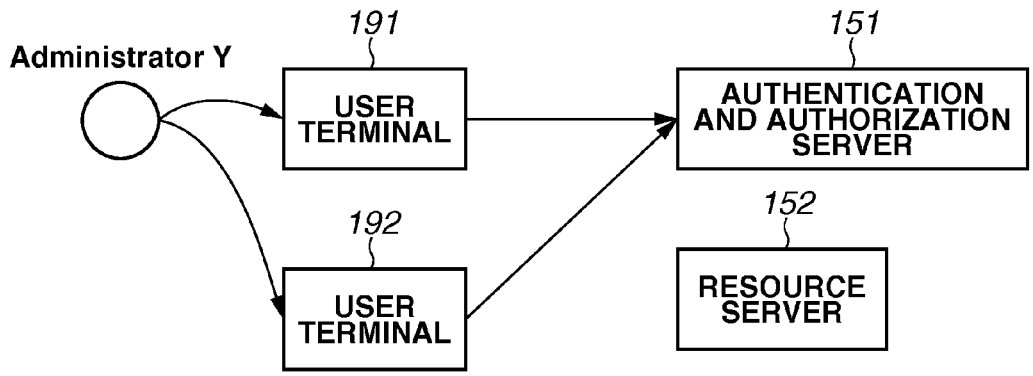
FIGS. 9A, 9B, and 9C schematically illustrate user operations according to the first exemplary embodiment.
Figure 9B:
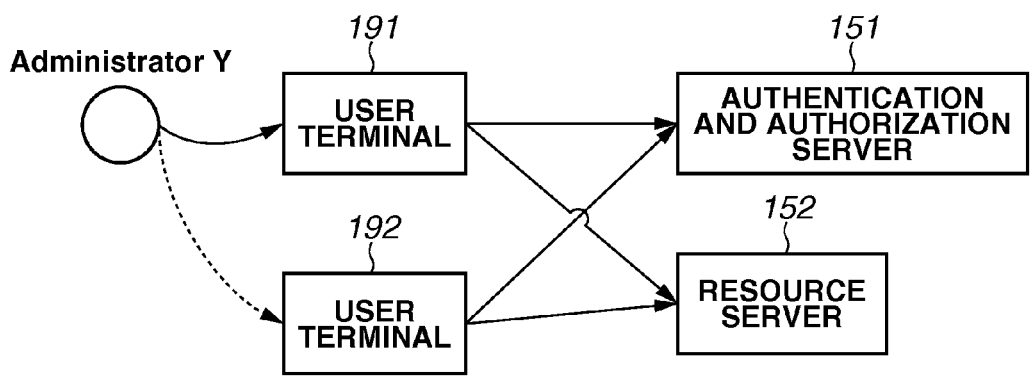
Figure 9C:
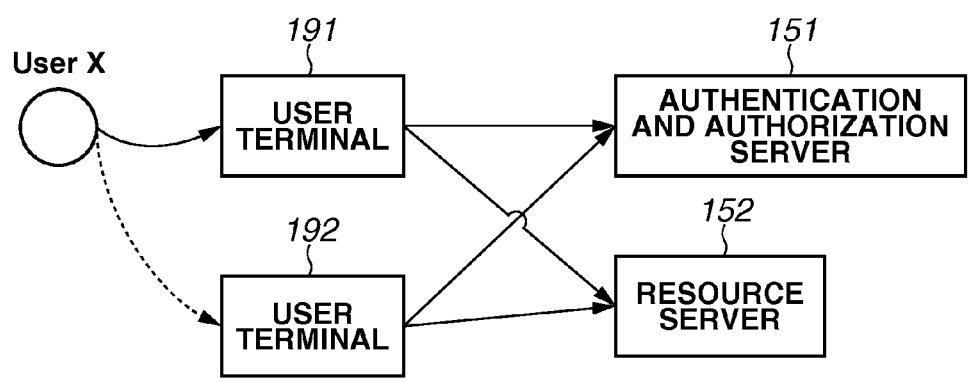

FIGS. 9A, 9B, and 9C schematically illustrate the client identifier association and the authorization operation. FIG. 9A illustrates the manner in which Administrator Y, who is an administrator of the tenant, is associating the user terminals 191 and 192 with Tenant T, to which the tenant administrator belongs.

FIG. 9B illustrates the manner in which Administrator Y, who is an administrator of the tenant, is performing an authorization operation for issuing an access token via the authentication and authorization server 151 so as to use the function of the resource server 152. Here, in order to issue an access token to the user terminal 191, Administrator Y is required to perform the authorization operation (indicated with a solid line leading from Administrator Y to the user terminal 191). However, having performed the authorization operation with the user terminal 191 to issue an access token thereto enables Administrator Y to dispense with an authorization operation to issue an access token to the user terminal 192 (indicated with a broken line leading from Administrator Y to the user terminal 192). This is because both the user terminals 191 and 192 are associated with Tenant T according to the operation illustrated in FIG. 9A and there is a past record that Administrator Y performed the authorization operation to issue an access token to the user terminal 191. In this way, Administrator Y can dispense with an authorization operation to be performed with the second terminal, so that user convenience can be improved.

FIG. 9C illustrates the manner in which User X, who is a general user of the tenant, is performing an authorization operation for issuing an access token with the authentication and authorization server 151 so as to use the function of the resource server 152. Here, in order to issue an access token to the user terminal 191, User X is required to perform the authorization operation (indicated with a solid line leading from User X to the user terminal 191). However, having performed the authorization operation with the user terminal 191 to issue an access token thereto enables User X to dispense with an authorization operation to issue an access token to the user terminal 192 (indicated with a broken line leading from User X to the user terminal 192). This is because both the user terminals 191 and 192 are associated with Tenant T according to the operation illustrated in FIG. 9A and there is a past record that User X performed the authorization operation to issue an access token to the user terminal 191. In this way, User X can dispense with an authorization operation to be performed with the second terminal, so that user convenience can be further improved as compared with Administrator Y.

According to the present exemplary embodiment, it is checked whether an access token has already been issued for any of client identifiers associated with the tenant to which the user belongs. Then, an access token can also been issued without the authorization operation even for a client identifier for which no access token has been issued among the client identifiers. Furthermore, when the administrator of the tenant associates, in advance, client identifiers with the tenant to which the administrator belongs, a user other than the administrator becomes no longer required to perform an operation for associating the client identifier with the tenant. Furthermore, the user can dispense with the authorization operation with respect to a terminal the association of which has been performed in advance, so that user convenience can be improved.

Next, a second exemplary embodiment is described with reference to the drawings. Portions similar to those of the first exemplary embodiment are omitted from the following description, and only portions different from those of the first exemplary embodiment are described. While, in the first exemplary embodiment, the client terminal is associated with the tenant, the second exemplary embodiment deals with a method in which the client identifier can also be associated with the user. With which of the tenant and the user to associate the client identifier is determined based on the client type. Here, suppose that the client type of each client identifier is determined in advance according to some method.

Suppose that a terminal with the client type set as an individual setting terminal is a terminal in which the client is associated with the user, and the authorization operation can be dispensed with between the individual setting terminals, as described below. Furthermore, suppose that a terminal with the client type set as a common setting terminal is a terminal in which the client is associated with the tenant, and the authorization operation can be dispensed with between the common setting terminals, as described below. Furthermore, suppose that an authorization operation can be dispensed with for a common setting terminal even in a case where the authorization operation has already been performed for an individual setting terminal. The flow of authorization operation necessity determination is described below with reference to FIG. 11.

FIGS. 10A and 10B illustrate module configurations of the authentication and authorization server 151 and the user terminal 191, respectively, according to the second exemplary embodiment. The authentication and authorization server 151 includes a client identifier management module 301, an authentication module 302, and an authorization module 304. The authentication and authorization server 151 further includes a second authorization operation necessity determination module 306 and a second client identifier association management module 307. Furthermore, the user terminal 191 includes a client module 351, a client association request module 352, and a second client association request module 353. The user terminals 192 and 193 each have a configuration illustrated in FIG. 10B, like the user terminal 191. Furthermore, in the present exemplary embodiment, suppose that the user terminals 191 and 192 are common setting terminals, and the user terminal 193 is an individual setting terminal.

In the second exemplary embodiment, suppose that the flow of client identifier issuance request is similar to that illustrated in FIG. 4A, and the flow of client identifier issuance is similar to that illustrated in FIG. 4B. Furthermore, in the second exemplary embodiment, suppose that the flow of access from the user terminal to the resource is similar to that illustrated in FIG. 5A, and the flow of access token issuance is similar to that illustrated in FIG. 5B.

Figure 11:
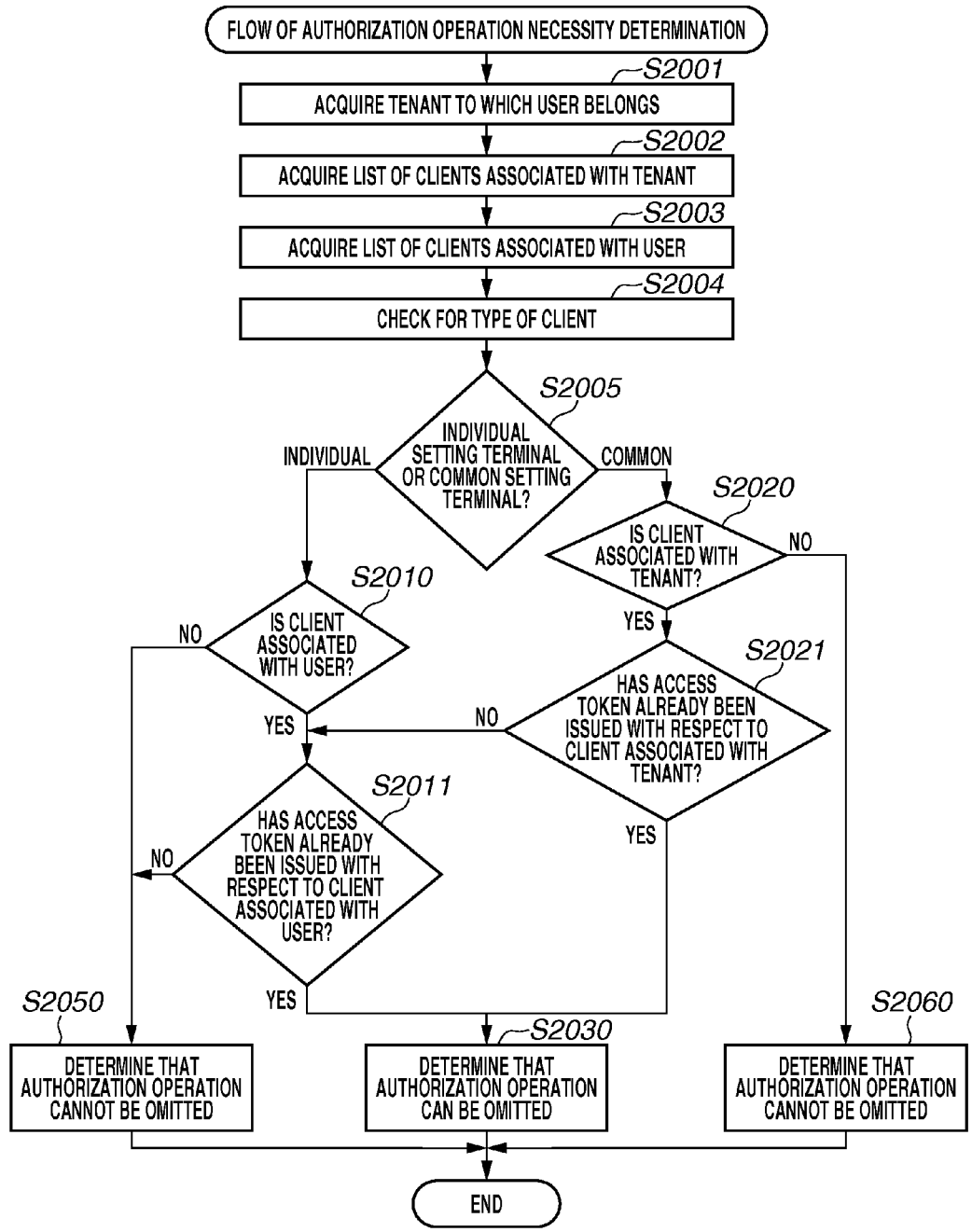
FIG. 11 is a flowchart illustrating the flow of authorization operation necessity determination according to the second exemplary embodiment.

FIG. 11 is a flowchart illustrating the flow of authorization operation necessity determination in the authentication and authorization server 151 according to the second exemplary embodiment. The flow illustrated in FIG. 11 indicates the details of the flow in step S1104 illustrated in FIG. 5B. In step S2001, the second authorization operation necessity determination module 306 acquires a tenant to which the user belongs, based on the user information included in the access token request received in step S1101. In order to acquire the tenant, it is necessary to refer to a user management table such as that set forth as Table 2 above. Here, for example, if the user is "User X", the tenant to which the user belongs is determined as "Tenant T".

In step S2002, the second authorization operation necessity determination module 306 acquires a list of client identifiers associated with the tenant acquired in step S2001. In order to acquire the client identifiers, the second authorization operation necessity determination module 306 refers to a client identifier association table such as that set forth as Table 3 above. Here, for example, if the tenant is "Tenant T", the client identifiers associated with the tenant "Tenant T" are determined as "AppAm001" and "AppAm002".

In step S2003, the second authorization operation necessity determination module 306 acquires a list of client identifiers associated with the user, based on the user information included in the access token request received in step S1101. In order to acquire the client identifiers, the second authorization operation necessity determination module 306 refers to a second client identifier association table such as that set forth as Table 5 below. Here, for example, if the user is "User X", the client identifier associated with the user "User X" is determined as "AppAm003".

TABLE 5

| User | Client Identifier |
|---|---|
| User X | AppAm003 |
| . | . |
| . | . |
| . | . |

In step S2004, the second authorization operation necessity determination module 306 acquires a client type allocated to the client identifier, based on the client identifier included in the access token request received in step S1101. In order to acquire the client type, the second authorization operation necessity determination module 306 refers to a second client identifier table such as that set forth as Table 6 below. In Table 6, the client type of a common setting terminal is expressed as "tenant", and the client type of an individual setting terminal is expressed as "user".

TABLE 6

| Client Identifier | Client Type |
|---|---|
| AppAm001 | tenant |
| AppAm002 | tenant |
| AppAm003 | user |
| . | . |
| . | . |
| . | . |

Here, for example, the client type allocated to the client identifiers AppAm001 and AppAm002 is a common setting terminal, and the client type allocated to the client identifier AppAm003 is an individual setting terminal. In step S2005, the second authorization operation necessity determination module 306 determines whether the client type acquired in step S2004 is an individual setting terminal or a common setting terminal. If the second authorization operation necessity determination module 306 determines that the client type is an individual setting terminal (INDIVIDUAL in step S2005), the processing proceeds to step S2010. If the second authorization operation necessity determination module 306 determines that the client type is a common setting terminal (COMMON in step S2005), the processing proceeds to step S2020.

In step S2010, the second authorization operation necessity determination module 306 determines whether the client identifier included in the access token request received in step S1101 is included in the list of client identifiers acquired in step S2003. If the second authorization operation necessity determination module 306 determines that the client identifier is included in the acquired list of client identifiers (YES in step S2010), since the second authorization operation necessity determination module 306 determines that the client identifier having requested an access token is already associated with the user, the processing proceeds to step S2011. If the second authorization operation necessity determination module 306 determines that the client identifier is not included in the acquired list of client identifiers (NO in step S2010), since the second authorization operation necessity determination module 306 determines that the client identifier having requested an access token is not associated with the user, the processing proceeds to step S2050.

In step S2011, the second authorization operation necessity determination module 306 determines whether an access token for the user has already been issued with respect to any client identifier in the list of client identifiers acquired in step S2003. If the second authorization operation necessity determination module 306 determines that the access token has already been issued (YES in step S2011), the processing proceeds to step S2030. If the second authorization operation necessity determination module 306 determines that the access token has not yet been issued (NO in step S2011), the processing proceeds to step S2050. Here, the second authorization operation necessity determination module 306 refers to an access token table such as that set forth as Table 4 above, and determines whether an access token for the user corresponding to a client identifier included in the list exists. For example, suppose that the user is "User X" and the list of client identifiers includes "AppAm003". In this instance, it is determined from Table 4 that the access token for the user "User X" does not exist.

In step S2020, the second authorization operation necessity determination module 306 determines whether the client identifier included in the access token request received in step S1101 is included in the list of client identifiers acquired in step S2002. If the second authorization operation necessity determination module 306 determines that the client identifier is included in the acquired list of client identifiers (YES in step S2020), since the second authorization operation necessity determination module 306 determines that the client identifier having requested an access token is already associated with the tenant to which the user belongs, the processing proceeds to step S2021. If the second authorization operation necessity determination module 306 determines that the client identifier is not included in the acquired list of client identifiers (NO in step S2020), since the second authorization operation necessity determination module 306 determines that the client identifier having requested an access token is not associated with the tenant to which the user belongs, the processing proceeds to step S2060.

In step S2021, the second authorization operation necessity determination module 306 determines whether an access token for the user has already been issued with respect to any client identifier in the list of client identifiers acquired in step S2002. If the second authorization operation necessity determination module 306 determines that the access token has already been issued (YES in step S2021), the processing proceeds to step S2030. If the second authorization operation necessity determination module 306 determines that the access token has not yet been issued (NO in step S2021), the processing proceeds to step S2011, in which the second authorization operation necessity determination module 306 checks for the issuance of an access token to the client identifier associated with the user. Here, the second authorization operation necessity determination module 306 refers to an access token table such as that set forth as Table 4 above, and determines whether an access token for the user corresponding to a client identifier included in the list exists. For example, suppose that the user is "User X" and the list of client identifiers includes "AppAm001" and "AppAm002". In this instance, it is determined from Table 4 that an access token for the user "User X" exists with respect to the client identifier "AppAm001".

In step S2030, the second authorization operation necessity determination module 306 determines that the authorization operation can be omitted to issue an access token. Then, the processing ends. The result of determination in step S2030 is used in step S1105 illustrated in FIG. 5B. In step S2050, the second authorization operation necessity determination module 306 determines that the authorization operation cannot be omitted to issue an access token. Then, the processing ends. The result of determination in step S2050 is used in step S1105 illustrated in FIG. 5B. In step S2060, the second authorization operation necessity determination module 306 determines that the authorization operation cannot be omitted to issue an access token. Then, the processing ends. The result of determination in step S2060 is used in step S1105 illustrated in FIG. 5B.

FIG. 12A is a flowchart illustrating the flow of client identifier association necessity determination in the authentication and authorization server 151 according to the second exemplary embodiment. The flow illustrated in FIG. 12A is started in response to the authentication and authorization server 151 receiving, from the client module 351, an access including user information. For example, the flow may be executed after the user's login operation in step S1103 illustrated in FIG. 5B.

In step S2101, the second client identifier association management module 307 receives an access from the client module 351. The access received in step S2101 includes user information and a client identifier. In step S2102, the second client identifier association management module 307 determines whether the client type of the client identifier included in the access received in step S2101 is a common setting terminal. If the second client identifier association management module 307 determines that the client type is a common setting terminal (YES in step S2102), the processing proceeds to step S2103. If the second client identifier association management module 307 determines that the client type is not a common setting terminal (NO in step S2102), the processing proceeds to step S2111. In the determination of the client type in step S2102, the second client identifier association management module 307 refers to a second client identifier table such as that set forth in Table 6 above.

In step S2103, the second client identifier association management module 307 determines whether the client identifier has already been associated with the tenant to which the user belongs, based on the user information and the client identifier, which are included in the access received in step S2101. If the second client identifier association management module 307 determines that the client identifier has already been associated with the tenant (YES in step S2103), the processing ends without the second client identifier association management module 307 requesting the client to check for the association between the tenant and the client identifier. If the second client identifier association management module 307 determines that the client identifier has not yet been associated with the tenant (NO in step S2103), the processing proceeds to step S2104. In the determination in step S2103, the tenant to which the user belongs is determined based on the user management table set forth in Table 2 above, and the tenant with which the client is associated is determined based on the client identifier association table set forth in Table 3 above.

In step S2104, the second client identifier association management module 307 determines whether a user indicated by the user information included in the access received in step S2101 has an authority to associate a client identifier with a tenant. In the determination performed in step S2104, suppose that, when a user is the administrator of a tenant, the user has an authority to associate a client identifier with the tenant. Furthermore, in the determination performed in step S2104, the authority of the user is determined based on the user management table set forth in Table 2. If the second client identifier association management module 307 determines that the user has an authority to associate a client identifier with a tenant (YES in step S2104), the processing proceeds to step S2105. If the second client identifier association management module 307 determines that the user has no authority to associate a client identifier with a tenant (NO in step S2104), the processing ends without the second client identifier association management module 307 requesting the client to check for the association between the tenant and the client identifier. In step S2105, the second client identifier association management module 307 requests the client module 351 to check for the association between the tenant and the client identifier. Upon completion of the request for checking of the association between the tenant and the client identifier, the processing ends.

In step S2111, the second client identifier association management module 307 determines whether the client identifier has already been associated with the user, based on the user information and the client identifier, which are included in the access received in step S2101. If the second client identifier association management module 307 determines that the client identifier has already been associated with the user (YES in step S2111), the processing ends without the second client identifier association management module 307 requesting the client to check for the association between the user and the client identifier. If the second client identifier association management module 307 determines that the client identifier has not yet been associated with the user (NO in step S2111), the processing proceeds to step S2112. In the determination in step S2111, the user with which the client is associated is determined based on the client identifier association table set forth in Table 5 above. In step S2112, the second client identifier association management module 307 requests the client module 351 to check for the association between the user and the client identifier. Upon completion of the request for checking of the association between the user and the client identifier, the processing ends.

FIG. 12B is a flowchart illustrating the flow of client identifier association checking in the user terminal 191 according to the second exemplary embodiment. The flow illustrated in FIG. 12B is started in response to the user terminal 191 receiving, from the authentication and authorization server 151, the request for checking of the association between the user and the client identifier, which is performed in step S2112 illustrated in FIG. 12A. Furthermore, if the request received by the user terminal from the authentication and authorization server 151 is the request for checking of the association between the tenant and the client identifier, which is performed in step S2105 illustrated in FIG. 12A, the flow illustrated in FIG. 7B is executed.

In step S2201, the second client association request module 353 displays a second client association checking screen 2501 such as that illustrated in FIG. 13 according to the request from the authentication and authorization server 151. Displaying the second client association checking screen 2501 is used to check with the user whether to associate the client identifier with the user him/herself.

In step S2202, the second client association request module 353 determines whether an instruction from the user to associate the client identifier with the user has been received as a result of checking in step S2201. If the second client association request module 353 determines that the instruction has been received (YES in step S2202), the processing proceeds to step S2203. If the second client association request module 353 determines that the instruction has not been received (NO in step S2202), the processing ends without the second client association request module 353 performing a client identifier association request. In step S2203, the second client association request module 353 transmits a client identifier association request to the authentication and authorization server 151. The client identifier association request to be transmitted to the authentication and authorization server 151 includes the tenant to which the user operating the user terminal 191 belongs and the client identifier received in step S403. Upon completion of the transmission of the client identifier association request, the processing ends.

FIG. 12C is a flowchart illustrating the flow of client identifier association in the authentication and authorization server 151 according to the second exemplary embodiment. The flow illustrated in FIG. 12C is started in response to the authentication and authorization server 151 receiving the client identifier association request from the user terminal 191. In step S2301, the second client identifier association management module 307 receives the client identifier association request from the client association request module 352 or the second client association request module 353. The client identifier association request received in step S2301 includes the user information and the client identifier. In step S2302, the second client identifier association management module 307 stores the client identifier included in the request received in step S2301 into the client identifier association table according to the request from the client. For example, if the association with the user is specified by the client, the second client identifier association management module 307 stores the client identifier in association with the specified user. Upon completion of the storage for association, the processing ends. FIG. 13 illustrates an example of the client association checking screen 2501, which is used to check with the user whether to associate the client identifier with the user.

In the second exemplary embodiment, in step S2021, the second authorization operation necessity determination module 306 determines whether an access token has already been issued with respect to any common setting terminal associated with the tenant to which the user belongs. Here, if no access token has been issued with respect to any common setting terminal, this means that the user has not performed an authorization operation with any common setting terminal. However, the processing does not proceed to step S2060, in which the second authorization operation necessity determination module 306 determines that the authorization operation cannot be omitted. Instead, the processing proceeds to step S2011, in which the second authorization operation necessity determination module 306 determines whether an access token has already been issued with respect to any client identifier associated with the user. On the other hand, if, in step S2011, it is not determined that an access token has already been issued, the second authorization operation necessity determination module 306 determines that the authorization operation cannot be omitted, without checking for the issuance of an access token with respect to the client identifier associated with the tenant to which the user belongs. This branches the processing in consideration of different ways of use of an individual setting terminal and a common setting terminal.

Since an individual setting terminal is a terminal that is associated with the user, it can be said that personal data about the user is stored in the individual setting terminal. On the other hand, since a common setting terminal is a terminal that is associated with the tenant, it can be said that shared data is mainly stored in the common setting terminal. Therefore, from the point of view of the user, whether to authorize the individual setting terminal needs to be more securely determined. Accordingly, in order to determine whether to omit an authorization operation for an individual setting terminal, the second authorization operation necessity determination module 306 checks whether an access token has already been issued only with respect to client identifiers included in a list of individual setting terminals.

On the other hand, in order to determine whether to omit an authorization operation for a common setting terminal, in a case where no access token has been issued with respect to client identifiers included in a list of common setting terminals, the second authorization operation necessity determination module 306 also checks whether an access token has already been issued with respect to client identifiers included in a list of individual setting terminals. This is because it can be considered that, if an authorization operation has been performed on an individual setting terminal, which is to be more securely dealt with than a common setting terminal, an authorization operation may be omitted for the common setting terminal, which is at a relatively low security level.

The above-described processing is expressed at the conditional branching in step S2011 and step S2021 illustrated in FIG. 11. According to the second exemplary embodiment, since whether to omit an authorization operation is determined in consideration of the client type, the security at the time of using an individual setting terminal can be secured and the user convenience at the time of using a common setting terminal can be improved.

Next, a third exemplary embodiment is described with reference to the drawings. Portions similar to those of the first exemplary embodiment or the second exemplary embodiment are omitted from the following description, and only portions different from those of the first exemplary embodiment or the second exemplary embodiment are described.

Figure 14:
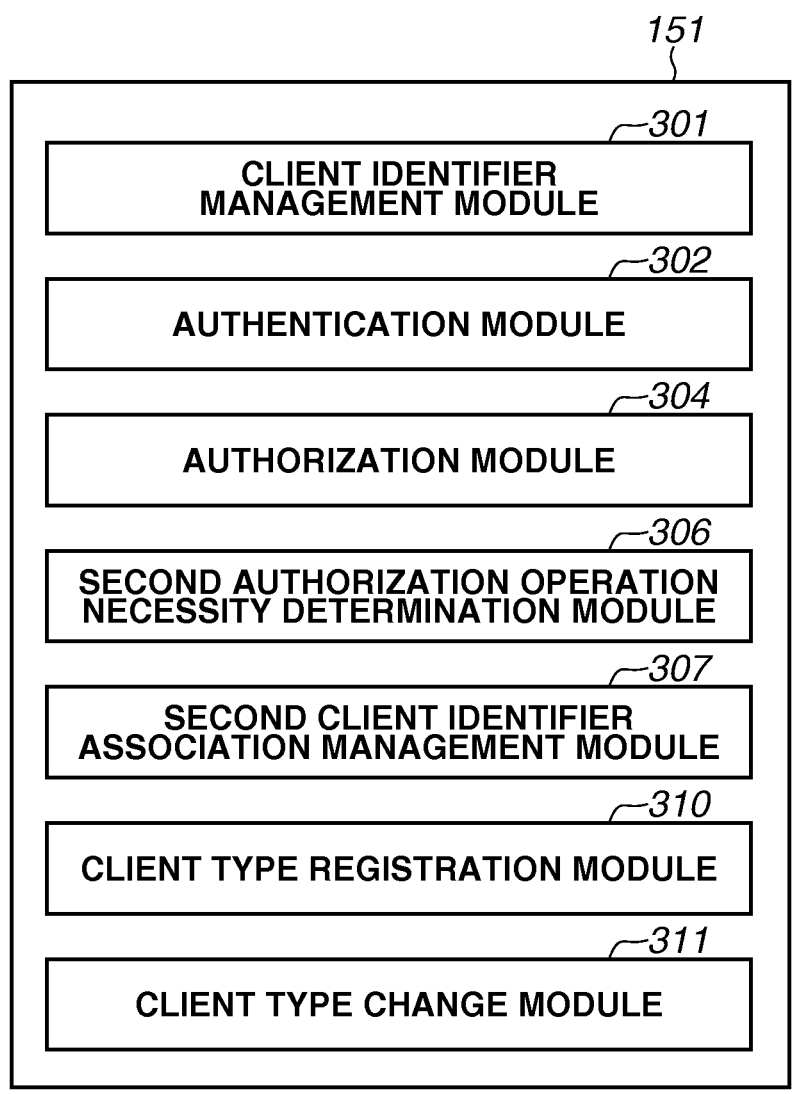
FIG. 14 illustrates a module configuration according to a third exemplary embodiment.

The third exemplary embodiment is described with regard to the registration and change of a client type. FIG. 14 illustrates a module configuration of the authentication and authorization server 151 according to the third exemplary embodiment. The authentication and authorization server 151 includes a client identifier management module 301, an authentication module 302, and an authorization module 304. The authentication and authorization server 151 further includes a second authorization operation necessity determination module 306 and a second client identifier association management module 307. The authentication and authorization server 151 further includes a client type registration module 310 and a client type change module 311.

Figure 15:
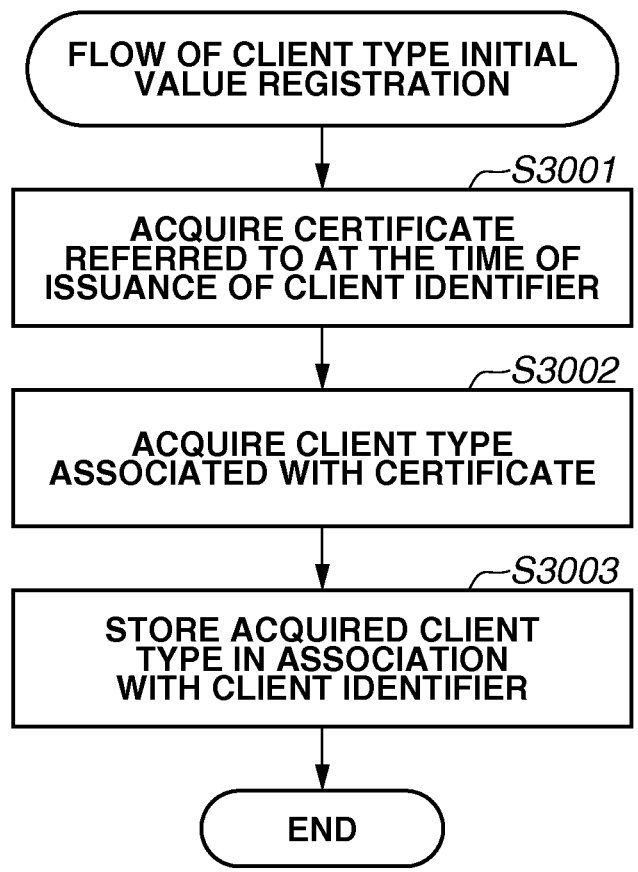
FIG. 15 is a flowchart illustrating the flow of client type initial registration according to the third exemplary embodiment.

FIG. 15 is a flowchart illustrating the flow of client type initial registration according to the third exemplary embodiment. The flow illustrated in FIG. 15 may be executed following the flow of client identifier issuance illustrated in FIG. 4B, or may be executed at the timing after then. In step S3001, the client type registration module 310 acquires a client certificate so as to determine an initial value of the client type that is to be allocated to the client identifier. This client certificate is the same as the certificate referred to in step S412. In step S3002, the client type registration module 310 refers to a default client table such as that set forth in Table 7 below, and acquires a default client type associated with the certificate.

TABLE 7

| Certificate | Default Client Type |
|---|---|
| PrintingDevice | tenant |
| Mobile | user |
| . | . |
| . | . |
| . | . |

Here, for example, if the certificate acquired in step S3001 is "PrintingDevice", the default client type "tenant" can be acquired. In step S3003, the client type registration module 310 stores the default client type acquired in step S3002 into a second client identifier table such as that set forth as Table 6. For example, in a case where the client identifier is "AppAm001" and the default client type acquired in step S3002 is "tenant", as shown in Table 6, the client type of the client identifier "AppAm001" is stored as "tenant".

Figure 16A:
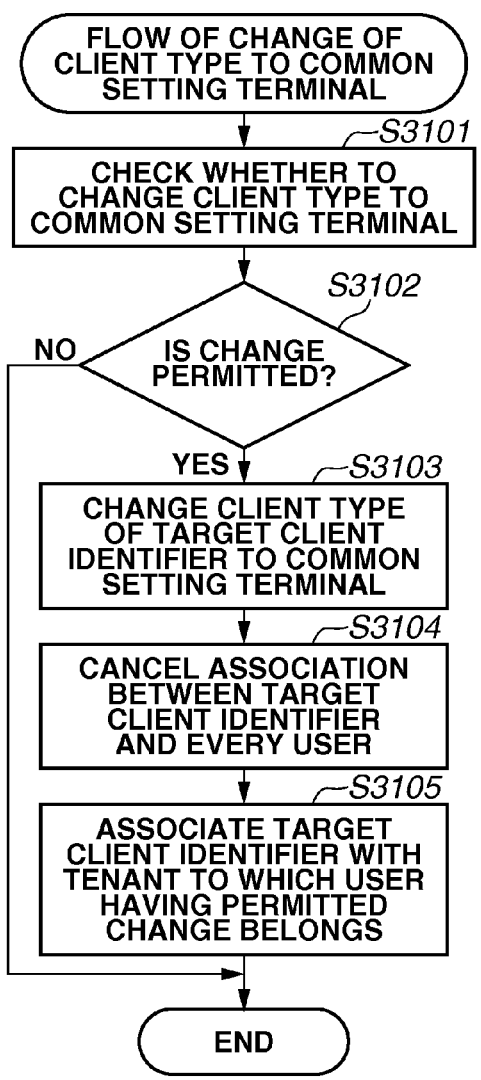
FIGS. 16A and 16B are flowcharts illustrating the flow of change of client type according to the third exemplary embodiment.

FIG. 16A is a flowchart illustrating the flow of change of the client type to a common setting terminal according to the third exemplary embodiment. The flow illustrated in FIG. 16A is started in response to the authentication and authorization server 151 being instructed by the user to change the client type of a client identifier to a common setting terminal. Furthermore, the flow illustrated in FIG. 16A may be executed following the flow of client type initial registration illustrated in FIG. 15, or may be executed at the timing after then.

Figure 17A:
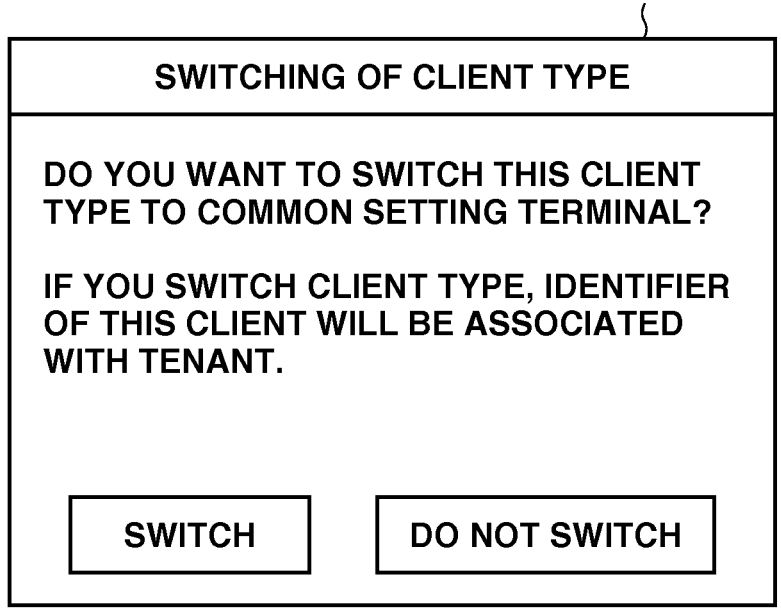
FIGS. 17A and 17B illustrate examples of display of screens according to the third exemplary embodiment.

In step S3101, the client type change module 311 displays a first client type switching screen 3501 such as that illustrated in FIG. 17A, and checks with the user whether to change the client type to a common setting terminal. In step S3102, the client type change module 311 determines whether the change of the client type is permitted by the user. If the client type change module 311 determines that the change of the client type is permitted by the user (YES in step S3102), the processing proceeds to step S3103. If the client type change module 311 determines that the change of the client type is not permitted by the user (NO in step S3102), the processing ends without the client type change module 311 changing the client type.

In step S3103, the client type change module 311 changes the client type of a target client identifier to a common setting terminal. In step S3104, the client type change module 311 cancels the association between the target client identifier and every user. In step S3105, the client type change module 311 associates the target client identifier with the tenant to which the user having permitted the change belongs. Upon completion of the association with the tenant, the processing ends.

Figure 16B:
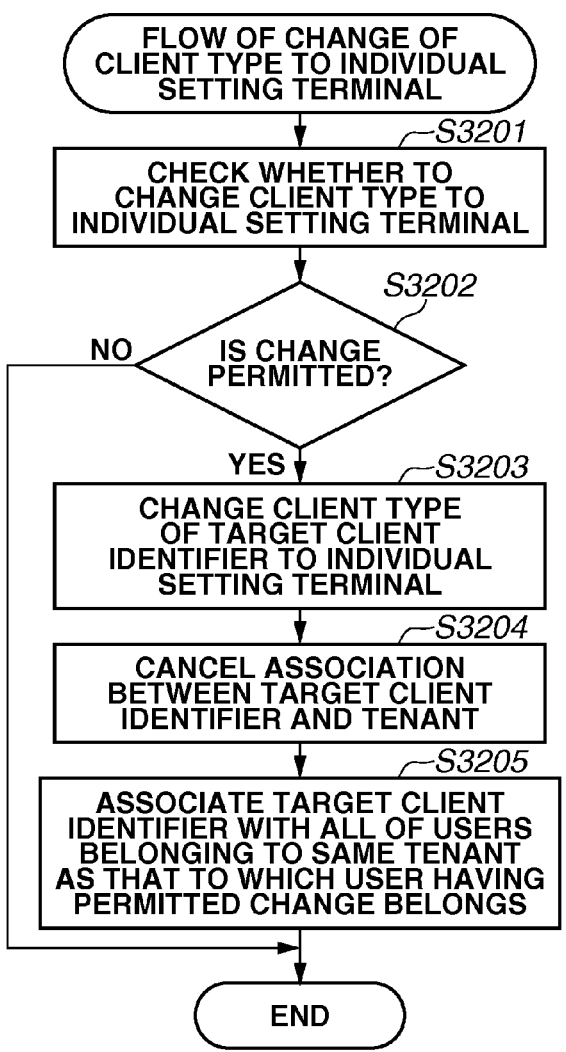

FIG. 16B is a flowchart illustrating the flow of change of the client type to an individual setting terminal. The flow illustrated in FIG. 16B is started in response to the authentication and authorization server 151 being instructed by the user to change the client type of a client identifier to an individual setting terminal. Furthermore, the flow illustrated in FIG. 16B may be executed following the flow of client type initial registration illustrated in FIG. 15, or may be executed at the timing after then.

Figure 17B:
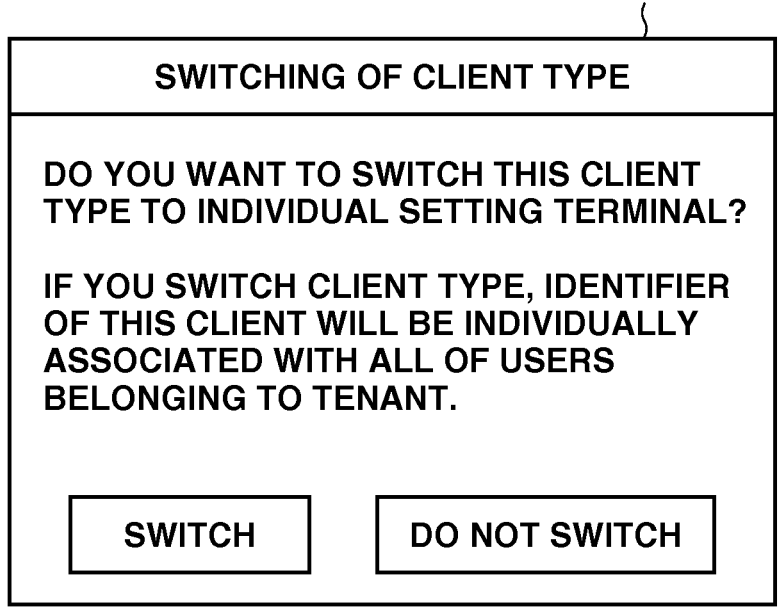

In step S3201, the client type change module 311 displays a second client type switching screen 3502 such as that illustrated in FIG. 17B, and checks with the user whether to change the client type to an individual setting terminal. In step S3202, the client type change module 311 determines whether the change of the client type is permitted by the user. If the client type change module 311 determines that the change of the client type is permitted by the user (YES in step S3202), the processing proceeds to step S3203. If the client type change module 311 determines that the change of the client type is not permitted by the user (NO in step S3202), the processing ends without the client type change module 311 changing the client type.

In step S3203, the client type change module 311 changes the client type of a target client identifier to an individual setting terminal. In step S3204, the client type change module 311 cancels the association between the target client identifier and the tenant. In step S3205, the client type change module 311 associates the target client identifier with all of the users belonging to the same tenant as that to which the user having permitted the change belongs. Upon completion of the association with the users, the processing ends.

FIGS. 17A and 17B illustrate examples of display of screens according to the third exemplary embodiment. FIG. 17A illustrates an example of the first client type switching screen 3501, which is used to change the client type to a common setting terminal. FIG. 17B illustrates an example of the second client type switching screen 3502, which is used to change the client type to an individual setting terminal.

According to the third exemplary embodiment, an initial value of the client type can be allocated to every terminal, and the client type of each terminal can be switched by the user according to the user's way to use each terminal, so that user convenience can be improved.

Additional embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-218724 filed Oct. 27, 2014, which is hereby incorporated by reference herein in its entirety.

What is claimed is:

1. An authority transfer system, which includes a terminal, a server that provides a service via a network, and a client that uses the service, the authority transfer system comprising:
   an authentication unit configured to determine, based on authentication information input by a user via an authentication screen displayed on the terminal, whether the user is an authorized user;
   an issuance unit configured to, in a case where the user determined by the authentication unit to be an authorized user has performed, via an authorization screen displayed on the terminal, an authorization operation to permit an authority of the user in the service to be transferred to the client provided in the terminal, issue authorization information indicating that the authority of the user has been transferred to the client;
   an authorization unit configured to authorize the client to use the service by the authority of the user based on the authorization information, which the terminal transmits to the client when the client makes a request to use the service; and
   a checking unit configured to check with the user whether to perform, on a tenant to which the user who has been determined by the authentication unit to be an authorized user belongs, a setting such that, when an additional user belonging to the tenant uses the service via the client provided in the terminal, the authorization information corresponding to the client is issued without the additional user performing the authorization operation,
   wherein, in response to the user performing the setting such that, when an additional user belonging to the tenant uses the service via the client provided in the terminal, the authorization information is issued without the additional user performing the authorization operation, the authorization unit authorizes the additional user to use the service without performing the authorization operation when the additional user uses the service via the client provided in the terminal
   wherein in a case where the terminal that the user uses is not a terminal in which common setting has been set, the checking unit checks with the user whether to perform, on the user who has been determined by the authentication unit to be an authorized user, a setting such that, when the user uses the service via a client provided in an additional terminal, the authorization information corresponding to the client provided in the additional terminal is issued without the user performing the authorization operation.

2. The authority transfer system according to claim 1, wherein, in response to the user performing the setting such that when an additional user belonging to the tenant uses the service via the client provided in the terminal, the authorization information is issued without the additional user performing the authorization operation, and to, when the additional user uses the service via a client provided in an additional terminal, authorization information corresponding to the client provided in the additional terminal having already been issued by the issuance unit according to the authorization operation performed by the additional user, the authorization unit authorizes the additional user to use the service without performing the authorization operation when the additional user uses the service via the terminal.

3. The authority transfer system according to claim 1, further comprising a determination unit configured to determine whether a type of the terminal that the user uses is a common setting terminal in which common setting is set,
   wherein, in a case where the determination unit determines that the type of the terminal is the common setting terminal, the checking unit checks with the user whether to perform, on a tenant to which the user who has been determined by the authentication unit to be an authorized user belongs, a setting such that, when an additional user belonging to the tenant uses the service via the client provided in the terminal, the authorization information corresponding to the client is issued without the additional user performing the authorization operation.

4. The authority transfer system according to claim 1, further comprising a management unit configured to, in response to the checking unit checking that a setting has been performed on the tenant such that the authorization information is issued without an additional user belonging to the tenant performing the authorization operation, manage a client identifier for identifying the client provided in the terminal and an identifier of the tenant specified based on an identifier of the user who has been determined by the authentication unit to be an authorized user while associating the client identifier and the identifier of the tenant with each other,
   wherein the authorization unit specifies an identifier of the additional user based on authentication information input by the additional user, and, in response to an identifier of the terminal that the additional user uses being associated with the identifier of the tenant associated with the specified identifier of the additional user, authorizes the additional user to use the service without performing the authorization operation when the additional user uses the service via the terminal.

5. A method executed by an authority transfer system, which includes a terminal, a server that provides a service via a network, and a client that uses the service, the method comprising:
   determining, based on authentication information input by a user via an authentication screen displayed on the terminal, whether the user is an authorized user;
   issuing, in a case where the user determined to be an authorized user has performed, via an authorization screen displayed on the terminal, an authorization operation to permit an authority of the user in the service to be transferred to the client provided in the terminal, authorization information indicating that the authority of the user has been transferred to the client;
   authorizing the client to use the service by the authority of the user based on the authorization information, which the terminal transmits to the client when the client makes a request to use the service;
   checking with the user whether to perform, on a tenant to which the user who has been determined to be an authorized user belongs, a setting such that, when an additional user belonging to the tenant uses the service via the client provided in the terminal, the authorization information corresponding to the client is issued without the additional user performing the authorization operation; and authorizing, in response to the user performing the setting such that, when an additional user belonging to the tenant uses the service via the client provided in the terminal, the authorization information is issued without the additional user performing the authorization operation, the additional user to use the service without performing the authorization operation when the additional user uses the service via the client provided in the terminal, wherein in a case where the terminal that the user uses is not a terminal in which common setting has been set, checking with the user whether to perform, on the user who has been determined to be an authorized user, a setting such that, when the user uses the service via a client provided in an additional terminal, the authorization information corresponding to the client provided in the additional terminal is issued without the user performing the authorization operation.

6. The method according to claim 5, further comprising authorizing, in response to the user performing the setting such that when an additional user belonging to the tenant uses the service via the client provided in the terminal, the authorization information is issued without the additional user performing the authorization operation, and to, when the additional user uses the service via a client provided in an additional terminal, authorization information corresponding to the client provided in the additional terminal having already been issued according to the authorization operation performed by the additional user, the additional user to use the service without performing the authorization operation when the additional user uses the service via the terminal.

7. The method according to claim 5, further comprising:
determining whether a type of the terminal that the user uses is a common setting terminal in which common setting is set; and
checking, in a case where it is determined that the type of the terminal is the common setting terminal, with the user whether to perform, on a tenant to which the user who has been determined to be an authorized user belongs, a setting such that, when an additional user belonging to the tenant uses the service via the client provided in the terminal, the authorization information corresponding to the client is issued without the additional user performing the authorization operation.

8. The method according to claim 7, further comprising checking, in a case where it is determined that the type of the terminal is not the common setting terminal, with the user whether to perform, on the user who has been determined to be an authorized user, a setting such that, when the user uses the service via a client provided in an additional terminal, the authorization information corresponding to the client provided in the additional terminal is issued without the user performing the authorization operation.

9. The method according to claim 5, further comprising:
managing, in response to checking that a setting has been performed on the tenant such that the authorization information is issued without an additional user belonging to the tenant performing the authorization operation, a client identifier for identifying the client provided in the terminal and an identifier of the tenant specified based on an identifier of the user who has been determined to be an authorized user while associating the client identifier and the identifier of the tenant with each other; and specifying an identifier of the additional user based on authentication information input by the additional user, and, authorizing, in response to an identifier of the terminal that the additional user uses being associated with the identifier of the tenant associated with the specified identifier of the additional user, the additional user to use the service without performing the authorization operation when the additional user uses the service via the terminal.

10. A non-transitory computer-readable storage medium storing computer executable instructions that cause a computer to execute a method for an authority transfer system, which includes a terminal, a server that provides a service via a network, and a client that uses the service, the method comprising:
determining, based on authentication information input by a user via an authentication screen displayed on the terminal, whether the user is an authorized user;
issuing, in a case where the user determined to be an authorized user has performed, via an authorization screen displayed on the terminal, an authorization operation to permit an authority of the user in the service to be transferred to the client provided in the terminal, authorization information indicating that the authority of the user has been transferred to the client;
authorizing the client to use the service by the authority of the user based on the authorization information, which the terminal transmits to the client when the client makes a request to use the service;
checking with the user whether to perform, on a tenant to which the user who has been determined to be an authorized user belongs, a setting such that, when an additional user belonging to the tenant uses the service via the client provided in the terminal, the authorization information corresponding to the client is issued without the additional user performing the authorization operation; and
authorizing, in response to the user performing the setting such that, when an additional user belonging to the tenant uses the service via the client provided in the terminal, the authorization information is issued without the additional user performing the authorization operation, the additional user to use the service without performing the authorization operation when the additional user uses the service via the client provided in the terminal,
wherein in a case where the terminal that the user uses is not a terminal in which common setting has been set, checking with the user whether to perform, on the user who has been determined to be an authorized user, a setting such that, when the user uses the service via a client provided in an additional terminal, the authorization information corresponding to the client provided in the additional terminal is issued without the user performing the authorization operation.

11. The non-transitory computer-readable storage medium according to claim 10, wherein the method further comprises authorizing, in response to the user performing the setting such that when an additional user belonging to the tenant uses the service via the client provided in the terminal, the authorization information is issued without the additional user performing the authorization operation, and to, when the additional user uses the service via a client provided in an additional terminal, authorization information corresponding to the client provided in the additional terminal having already been issued according to the authorization operation performed by the additional user, the additional user to use the service without performing the authorization operation when the additional user uses the service via the terminal.

12. The non-transitory computer-readable storage medium according to claim 10, wherein the method further comprises:
   determining whether a type of the terminal that the user uses is a common setting terminal in which common setting is set; and
   checking, in a case where it is determined that the type of the terminal is the common setting terminal, with the user whether to perform, on a tenant to which the user who has been determined to be an authorized user belongs, a setting such that, when an additional user belonging to the tenant uses the service via the client provided in the terminal, the authorization information corresponding to the client is issued without the additional user performing the authorization operation.

13. The non-transitory computer-readable storage medium according to claim 12, wherein the method further comprises checking, in a case where it is determined that the type of the terminal is not the common setting terminal, with the user whether to perform, on the user who has been determined to be an authorized user, a setting such that, when the user uses the service via a client provided in an additional terminal, the authorization information corresponding to the client provided in the additional terminal is issued without the user performing the authorization operation.

14. The non-transitory computer-readable storage medium according to claim 10, wherein the method further comprises:
   managing, in response to checking that a setting has been performed on the tenant such that the authorization information is issued without an additional user belonging to the tenant performing the authorization operation, a client identifier for identifying the client provided in the terminal and an identifier of the tenant specified based on an identifier of the user who has been determined to be an authorized user while associating the client identifier and the identifier of the tenant with each other; and
   specifying an identifier of the additional user based on authentication information input by the additional user, and, authorizing, in response to an identifier of the terminal that the additional user uses being associated with the identifier of the tenant associated with the specified identifier of the additional user, the additional user to use the service without performing the authorization operation when the additional user uses the service via the terminal.

* * * * *